July 2, 1974 R. J. STUMPF 3,822,162
PROCESS FOR MANUFACTURING HIGH-LOFT, NONWOVEN FABRIC
Filed July 10, 1972 10 Sheets-Sheet 2

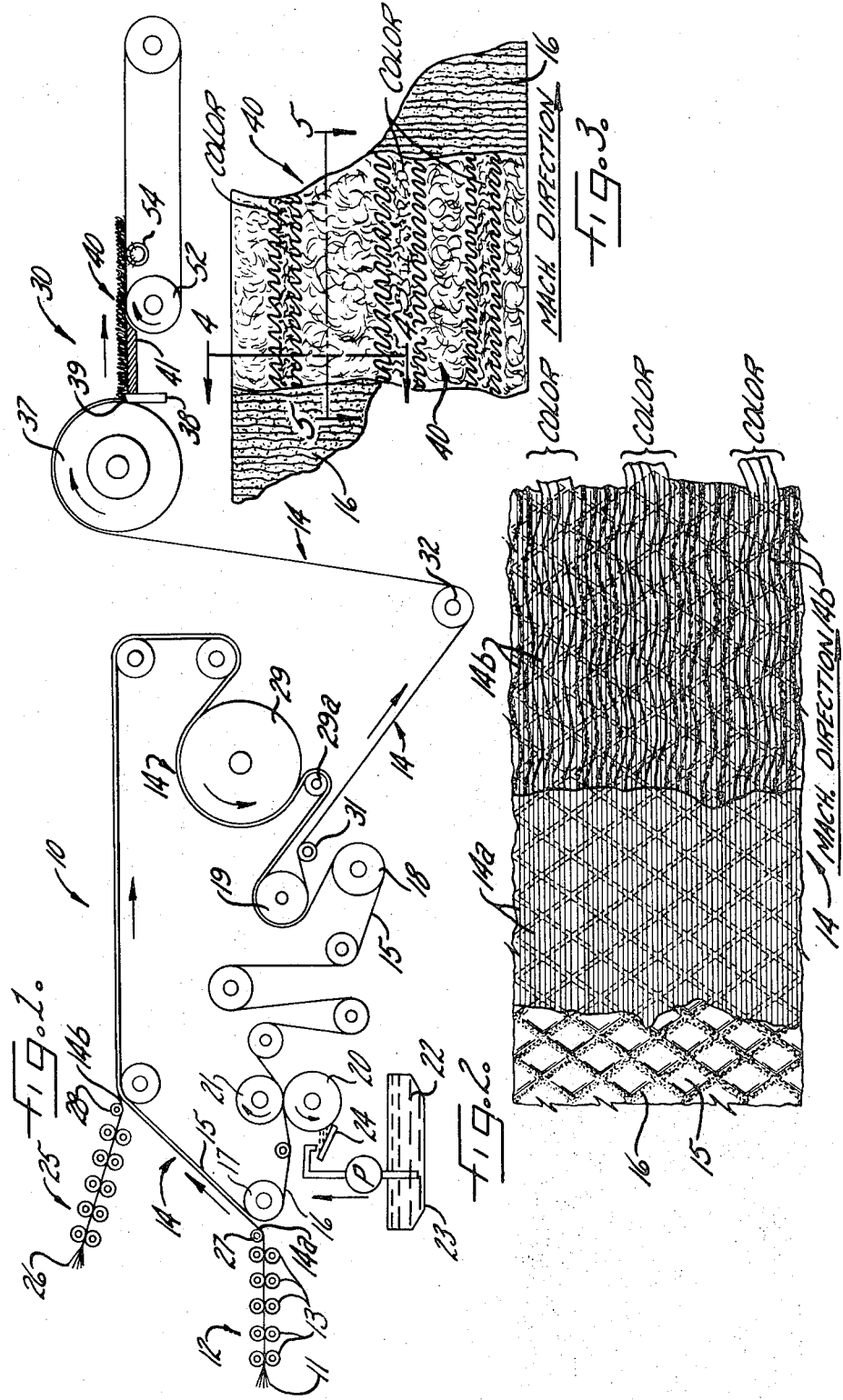

July 2, 1974 R. J. STUMPF 3,822,162
PROCESS FOR MANUFACTURING HIGH-LOFT, NONWOVEN FABRIC
Filed July 10, 1972 10 Sheets-Sheet 4

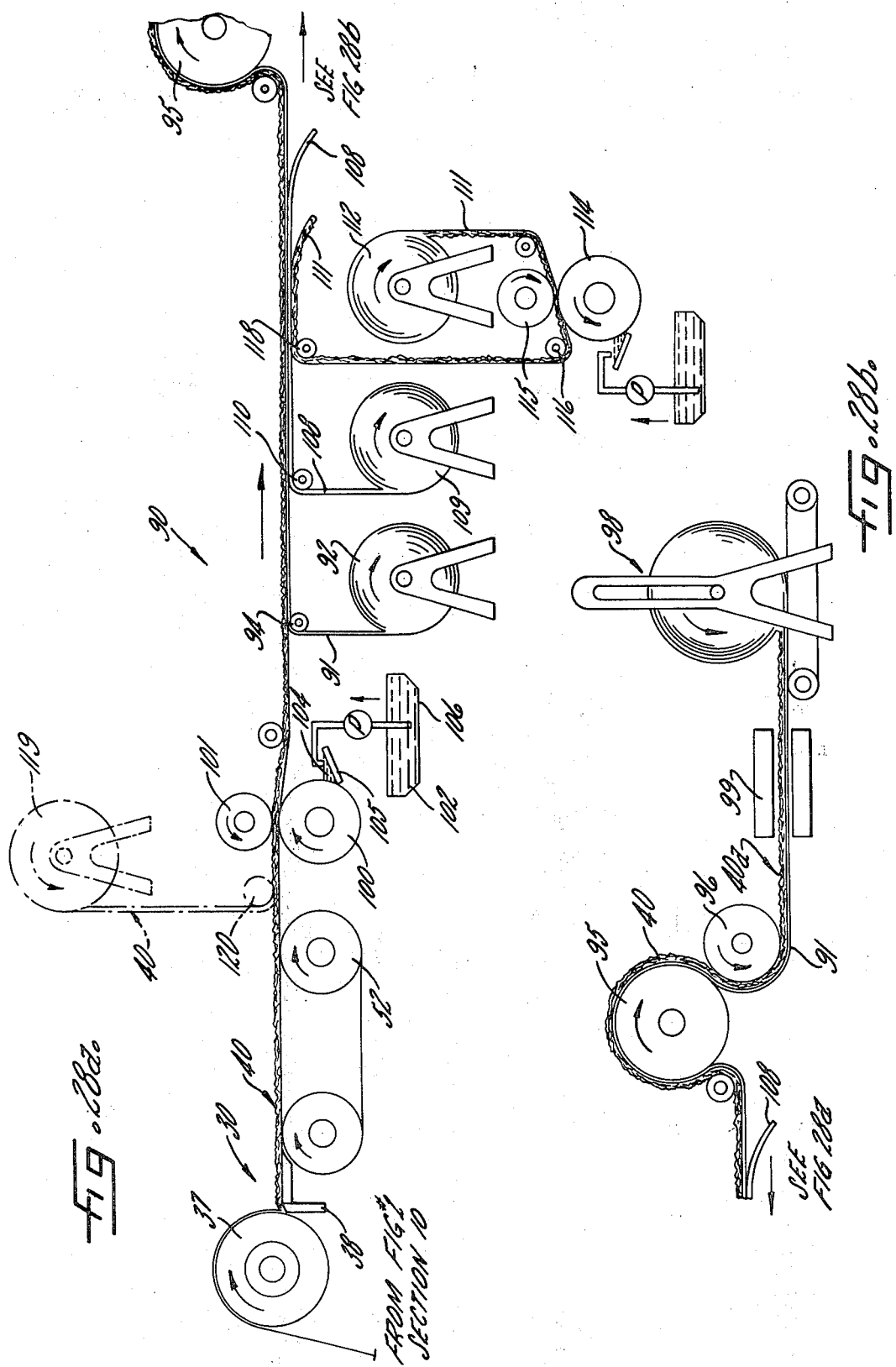

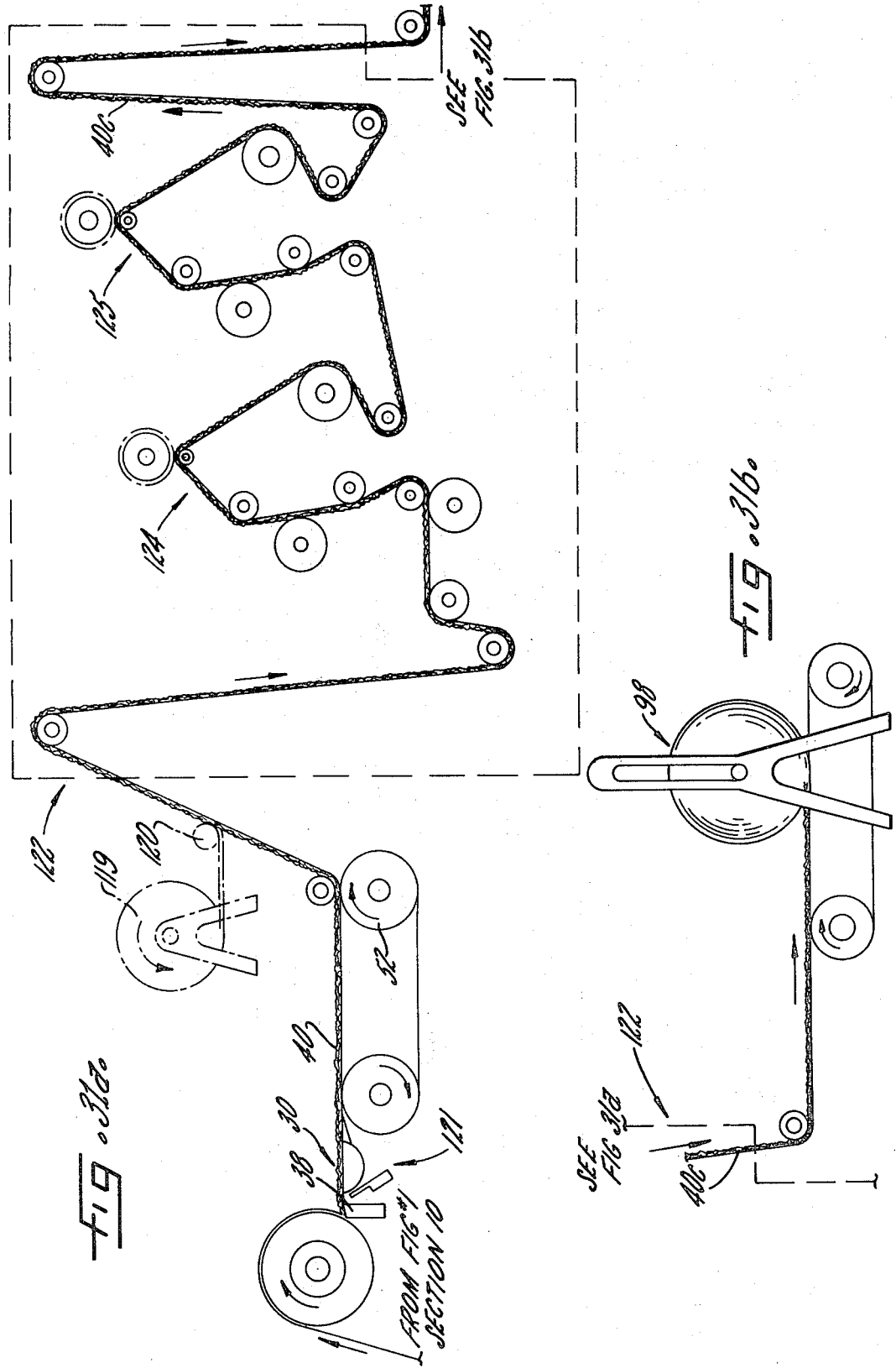

United States Patent Office 3,822,162
Patented July 2, 1974

3,822,162
PROCESS FOR MANUFACTURING HIGH-LOFT, NONWOVEN FABRIC
Robert J. Stumpf, Appleton, Wis., assignor to Kimberly-Clark Corporation, Neenah, Wis.
Continuation-in-part of application Ser. No. 31,225, Apr. 23, 1970, now Patent No. 3,709,768, which is a continuation-in-part of application Ser. No. 856,793, Sept. 10, 1969, now Patent No. 3,720,554. This application July 10, 1972, Ser. No. 270,469
Int. Cl. B32b 31/12
U.S. Cl. 156—279
65 Claims

ABSTRACT OF THE DISCLOSURE

A method of making a high-loft, nonwoven fabric with a substantially continuous backing layer of adhesive and a multiplicity of fibers looped outwardly from the backing, by first embedding a web of fibers in a layer of adhesive and then gathering the adhesive while softened into a substantially continuous backing layer while simultaneously looping the fibers outwardly from the backing. In certain instances, the loops may be subsequently shorn, the backing may be stretched or perforated, or the fabric may be laminated to an additional backing or backings to change the final characteristics of the product.

RELATED APPLICATIONS

George H. Saunders, Robert C. Sokolowski and Robert J. Stumpf, Ser. No. 498,929, filed Oct. 20, 1965, now abandoned and replaced by Ser. No. 79,287, filed Oct. 8, 1970.

Ronald H. Wideman, Ser. No. 551,605, filed May 20, 1966, and now U.S. Pat. No. 3,553,064.

Robert J. Stumpf and William L. Mowers, Ser. No. 553,483, filed May 27, 1966, and now U.S. Pat. No. 3,553,065.

Robert J. Stumpf, Ser. No. 769,959, filed Oct. 23, 1968, now abandoned and replaced by Ser. No. 31,225, filed Apr. 23, 1970, now U.S. Pat. No. 3,709,768.

Robert J. Stumpf, Ser. No. 820,224, filed Apr. 29, 1969, now U.S. Pat. No. 3,687,754.

Robert J. Stumpf, Ser. No. 856,793, filed Sept. 10, 1969 now U.S. Pat. No. 3,720,554.

Robert J. Stumpf and William J. Mattes, Ser. No. 23,929, filed Mar. 30, 1970, now U.S. Pat. No. 3,687,796.

Robert J. Stumpf and William J. Mattes, Ser. No. 30,900, filed Apr. 22, 1970, now abandoned.

Robert J. Stumpf and William J. Mattes, Ser. No. 144,241, filed May 17, 1971, now abandoned.

Herman G. Minshell, Robert J. Stumpf and William J. Mattes, Ser. No. 77,840, filed Oct. 5, 1970, now U.S. Pat. No. 3,729,353.

Adrian D. Drost, Ser. No. 175,559, filed Aug. 27, 1970, now abandoned.

Adrian D. Drost and Ronald P. Glanz, Ser. No. 170,599, filed Aug. 10, 1970, now U.S. Pat. No. 3,714,720.

DESCRIPTION OF THE INVENTION

This is a continuation-in-part of aforesaid application Ser. No. 31,225, filed Apr. 23, 1970, now U.S. Pat. No. 3,709,768, and of application Ser. No. 856,793, filed Sept. 10, 1969, now U.S. Pat. No. 3,720,554.

The present invention relates in general to nonwoven fabrics, and, more particularly, to methods for making high-loft, nonwoven fabrics.

In recent years, many different types of nonwoven materials have been produced, both to replace conventional woven fabrics and, also, to create new markets in which woven fabrics have not yet become established. This is particularly true in the case of materials for single-use and disposable products, such as: sanitary supplies, hospital garments, disposable sheets, and the like. For these applications the nonwoven fabric is generally made in continuous sheet form with one or more layers of staple length fibers and/or a reinforcing scrim structure adhesively bonded together or laminated between plies of other material such as cellulosic wadding and plastic sheeting. The fibers may be natural, synthetic or various blends and, of course, the particular composition of the nonwoven fabric is greatly influenced by its intended use.

Exemplary of such nonwoven fabrics are those disclosed in U.S. Pat. Nos. 2,902,395, 3,047,444, 3,072,511, 3,327,708, 3,484,330, 3,553,604 and 3,553,605 and the aforesaid copending U.S. patent application, Ser. No. 79,287, all of which are assigned to the same assignee as the present application. While the products disclosed in the foregoing issued patents and copending applications have many different attributes and characteristics, they all have one thing in common—viz., the principal fibers are nearly all disposed substantially parallel to the surfaces of the nonwoven material. As a result, the material is either relatively thin and flat or, such substantial thickness and surface texture as are imparted to the fabric are provided by creping or embossing various layers of the material or, in some instances, the final nonwoven fabric.

It is also well known that natural fibers, particularly cotton and wool, have an inherent kink or crimp resulting from the way in which these fibers grow. This natural crimp is, of course, highly beneficial and contributes largely to the strength of thread made of a multiplicity of staple length fibers. In addition, it is the natural crimp of these fibers that imparts certain characteristics of texture and body to materials woven therefrom.

In contrast, synthetic fibers, as initially formed, do not have any appreciable kink or crimp since they are generally formed in continuous monofilaments. However, it is also well known that most synthetic fibers can be crimped and heat-set by passing the fibers through a heated stuffing box.

It is the primary aim of the present invention to provide a method of making a nonwoven material which differs from the above and which is characterized by the gathering of a soft, tacky adhesive layer in which flexible elements such as fibers are embedded at spaced points on the elements while simultaneously looping the elements, to form a gathered adhesive backing layer with a fibrous surface, thereby producing a novel high-loft fabric with a pleasing surface texture and appearance.

It is a more particular object to provide a simple, economical and high speed production method of making a high-loft, nonwoven fabric from a web of fibers having an open adhesive pattern previously printed on one side by consolidating the adhesive into a substantially continuous backing sheet while simultaneously looping the fibers outwardly from the adhesive backing sheet.

A further object of the invention is the provision of a method for making high-loft, nonwoven fabrics characterized by having improved strength characteristics in the cross-direction of the fabric being produced.

A related object of the invention is the provision of a method of making a high-loft, nonwoven fabric in which the substantially continuous adhesive backing layer from which the fibers loop outwardly may subsequently be stretched, perforated or otherwise opened to form a discontinuous backing layer.

It is a further object to provide a method as described above which permits blending together fibers of differing colors or other characteristics in the initial web in order to achieve a high-loft, nonwoven fabric having a colored pattern or other desired characteristics of texture and/or appearance.

In one of its more specific aspects, it is an object of the invention to provide a simple and economical method of making a laminated, high-loft, nonwoven fabric from a web of fibers embedded at longitudinally spaced points on the fibers in a layer of adhesive, by consolidating or gathering the adhesive into a substantially continuous backing sheet while simultaneously looping the fibers outwardly from the backing, and thereafter laminating the fabric thus formed to an additional backing layer for the purpose of increasing the strength of the overall fabric and/or otherwise altering the characteristics of the fabric and its backing.

Other objects and advantages of the present invention will become more readily apparent upon reading the following detailed description and upon reference to the attached drawings, in which:

FIG. 1 is a schematic view, in side elevation, of one form of apparatus which may be employed to practice the method of the present invention;

FIG. 2 is a fragmentary plan view of an illustrative web of base material while still supported on a conveyor belt, somewhat simplified and exaggerated for the sake of clarity of illustration, with portions broken away to expose the various layers;

FIG. 3 is a fragmentary plan view of one embodiment of the product of the present invention;

Figure 4:
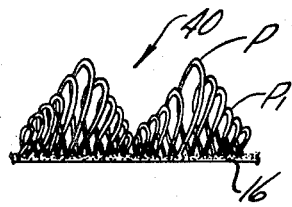
Figure 5:
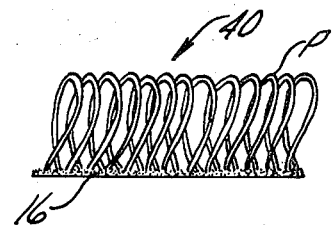
Figure 6:
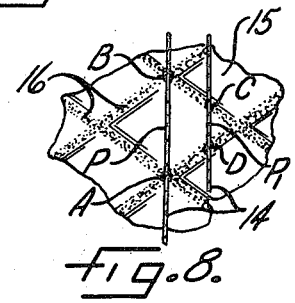
Figure 8:
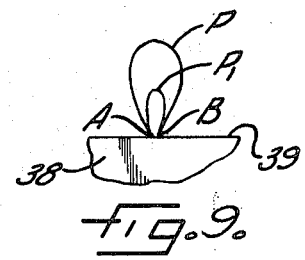
Figure 9:
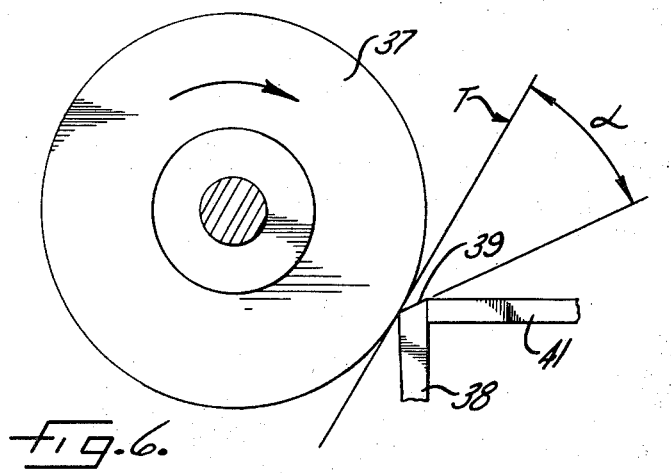
Figure 7:
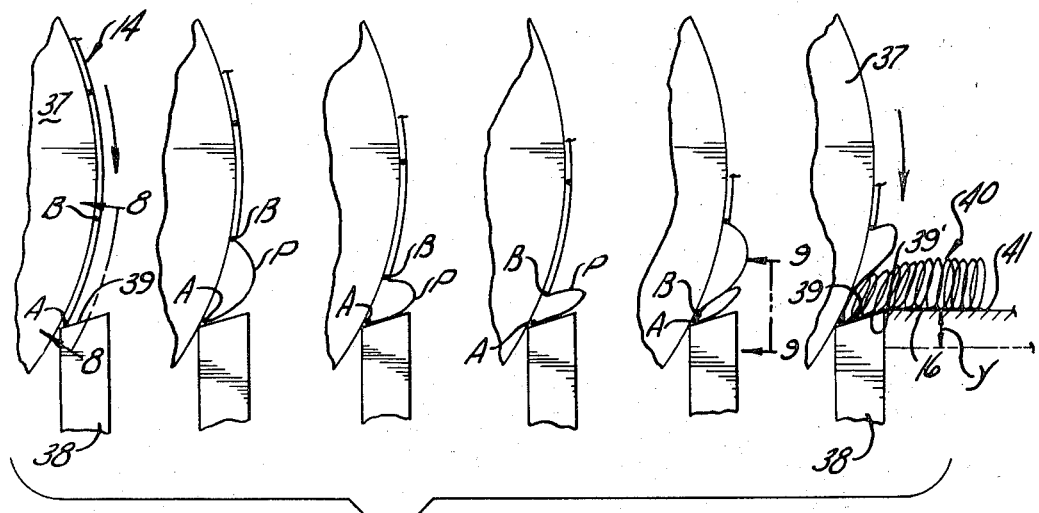
Figure 10:
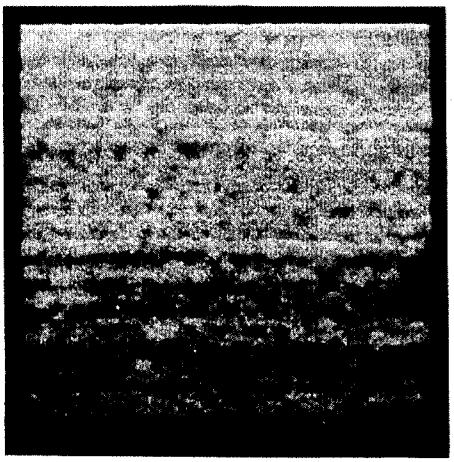
Figure 11:
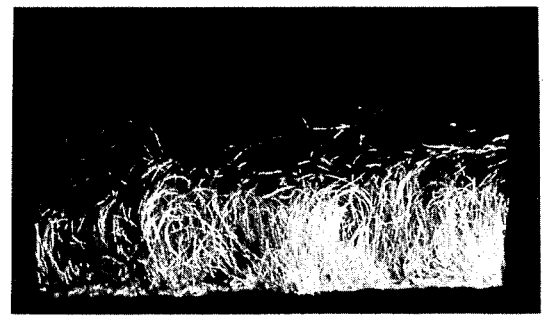
Figure 12:
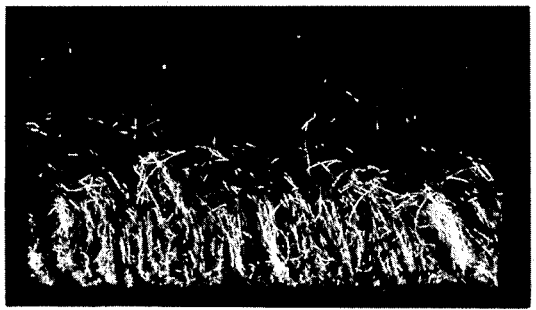
Figure 24:
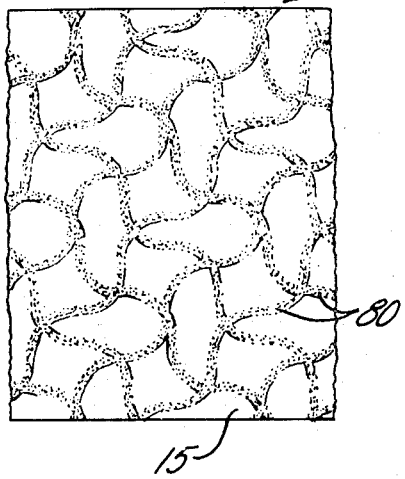
Figure 26:
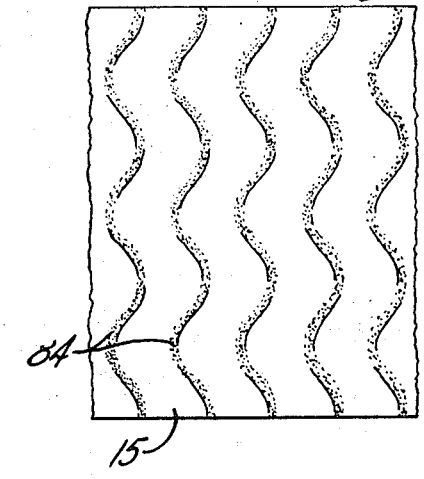
Figure 25:
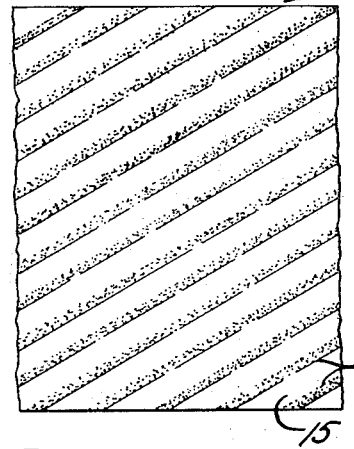
Figure 27:
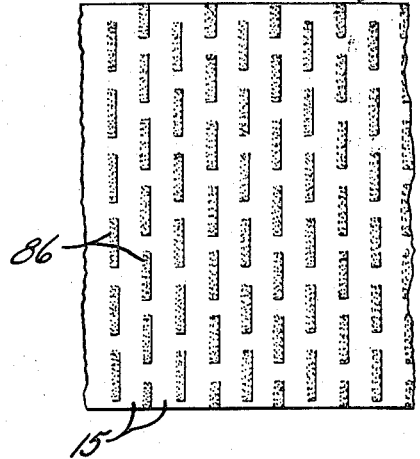
Figure 23:
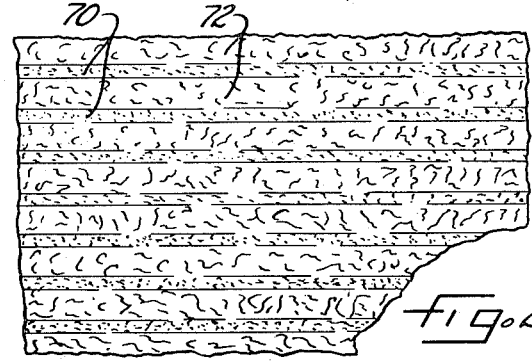
Figure 29:
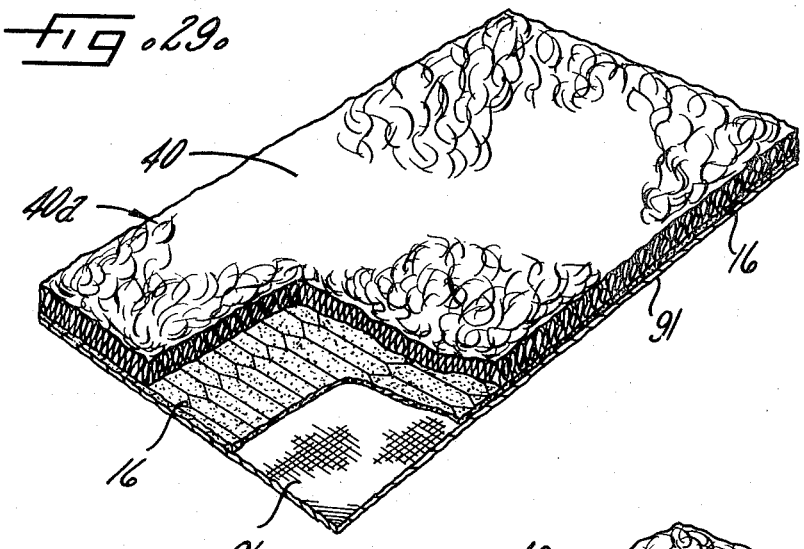
Figure 30:
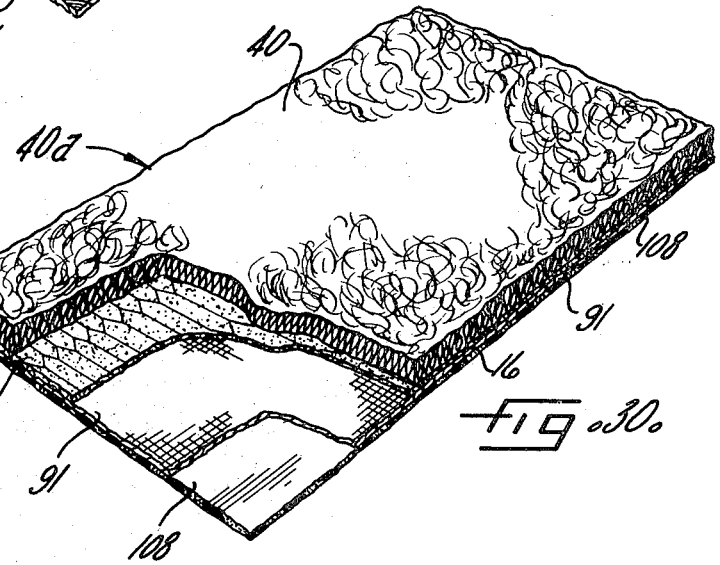
Figure 32:
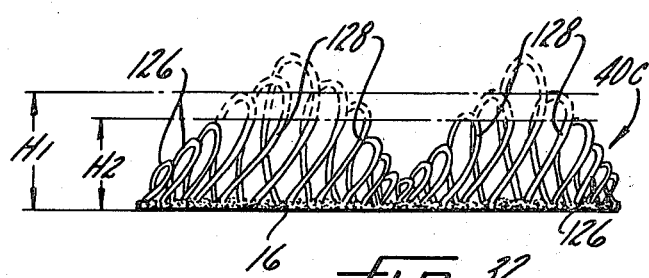
Figure 33:
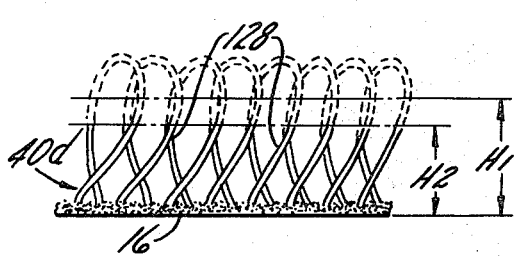

FIGS. 4 and 5, respectively, are greatly enlarged, simplified, and somewhat exaggerated sectional views taken substantially along the lines 4—4 and 5—5 in FIG. 3;

FIG. 6 is an enlarged schematic detail view, in side elevation, of the forming drum and gathering blade of the apparatus shown in FIG. 1;

FIG. 7 is an enlarged schematic side elevational view illustrating, in somewhat idealized fashion, successive stages in the sequence of gathering and looping of individual fibers;

FIG. 8 is an enlarged schematic fragmentary view, taken substantially along the line 8—8 of FIG. 7, here showing a fragment of the fiber web and adhesive pattern with illustrative fibers attached to the adhesive;

FIG. 9 is a simplified schematic view, taken substantially along the line 9—9 of FIG. 7, here showing the fragment of the fiber web and adhesive pattern depicted in FIG. 8 at a later stage in the loop forming sequence;

FIG. 10 is a photographic reproduction of a sample of one form of high-loft, nonwoven material made in accordance with the method of the present invention;

FIGS. 11 and 12, respectively, are enlarged photographic reproductions of transverse and longitudinal sectional views of the material shown in FIG .10;

FIGS. 13–22, respectively, are photographic reproductions illustrating other samples of material made in accordance with the method of the present invention;

FIG. 23 is a fragmentary plan view of a sample of a fabric product embodying the present invention;

FIGS. 24–27 illustrate, in plan view, exemplary alternative adhesive patterns that may be used for the base web in practicing the method of the present invention;

FIGS. 28a and 28b comprise fragmentary portions of a schematic view, in side elevation, of exemplary apparatus which may be employed to form laminated, high-loft, nonwoven fabrics in accordance with the present invention;

FIG. 29 is a fragmentary perspective view of an exemplary two-ply, laminated, high-loft, nonwoven fabric made in accordance with the present invention, here illustrated with portions of the fabric broken away to depict the internal fabric structure;

FIG. 30 is a fragmentary perspective view, similar to FIG. 29, of an exemplary three-ply, laminated, high-loft, nonwoven fabric made in accordance with the present invention;

FIGS. 31a and 31b comprise fragmentary portions of a schematic view, in side elevation, of exemplary apparatus which may be employed to shear a high-loft, nonwoven fabric made in accordance with the present invention to form a fabric having a cut-pile surface;

FIG. 32 is a greatly enlarged, simplified and somewhat exaggerated sectional view similar to FIG. 4, here illustrating in schematic form a high-loft, nonwoven fabric having a cut-pile surface wherein the fabric is formed utilizing an adhesive pattern of the types shown in FIGS. 2 and 8, or in FIG. 24; and, FIG. 33 is a greatly enlarged, simplified and somewhat exaggerated sectional view similar to FIG. 32, here illustrating in schematic form a high-loft, nonwoven fabric having a cut-pile surface wherein the fabric is formed utilizing an adhesive pattern of the types shown in FIGS. 25–27.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

THE ENVIRONMENT OF THE INVENTION

In practicing the method of the present invention in its preferred form, a base web of fibers is first prepared and embedded at spaced points on the fibers in a layer of adhesive. The layer of adhesive may be in the form of an open adhesive pattern applied to one side of the web, or as disclosed in greater detail in aforesaid Ser. No. 856,793, now U.S. Pat. No. 3,720,554, it may be in the form of a pattern of adhesive which has been smeared to provide a continuous layer of adhesive in which the fibers or elements are embedded at spaced points on the elements. Different procedures have been used in preparing the base web. For example, textile length fibers may be processed through conventional cotton card machinery to produce a carded web for the base web. In such a carded web 50% to 70% of the fibers may be oriented substantially parallel with the machine direction. It has been found, however, that the most uniform product has been obtained with the method of the present invention by using base webs having a higher percentage of the fibers alined with the machine direction such, merely by way of example, as a highly drafted web in which, as a result of the drafting process, 80% to 95% of the fibers may be alined with the machine direction. Such webs of bonded, highly drafted fibers, of course, have substantial utility in themselves and are the subject, for example, of the aforesaid copending application, Ser. No. 79,287 and U.S. Pat. No. 3,553,065. The present invention, however, goes far beyond the preparation of an adhesively bonded carded web or the products and methods disclosed in those two applications, and results in the formation of a high-loft, nonwoven fabric having significantly different characteristics than the nonwoven web utilized as the base material.

Broadly stated, the method of the present invention involves taking the base material and performing the subsequent steps of: (1) activating to a softened, tacky plastic state the layer of adhesive in which the fibers are embedded; and (2) gathering the softened adhesive layer and thereby consolidating the adhesive into a substantially continuous backing layer, while (3) simultaneously looping the portions of the fibers between the spaced points of embedment outwardly from the backing layer formed by the gathered, consolidated adhesive. The resulting product is characterized by the high-loft or deep pile of the loops of fibers which extend outwardly from the substantially continuous, nonuniform adhesive backing. The particular depth of pile or degree of loft of the loops, of course, depends upon a combination of control parameters including, for example: the type and denier of the base fibers; the amount and spacing of the original adhesive pattern; the angle of the gathering blade; and the relative speeds of fiber delivery to and fabric discharge from the gathering blade; as will be discussed below.

In addition, the present method also contemplates, in some instances, additional steps, such as: shearing the loops of the lofted fibers to provide a nonwoven fabric of cut-pile character; stretching or otherwise perforating the adhesive backing layer; laminating the high-loft, nonwoven fabric to an additional backing layer or layers; and/or blending together fibers of different colors or other characteristics in the base web in order to achieve color patterns or different surface textures and appearances in the final product. These additional steps will also be discussed below, following the detailed description of the over-all method taken in connection with the drawings.

Turning now to the drawings, FIG. 1 schematically illustrates an exemplary apparatus for performing the method of the present invention. This apparatus includes a web forming section 10 and an adhesive compacting and fiber looping section 30. The web forming section 10 is generally similar to the apparatus disclosed in the aforesaid copending application, Ser. No. 79,287, with certain modifications as disclosed in the aforesaid U.S. Pat. No. 3,553,065 but it is here shown in more complete and visible form than shown in either of those disclosures. It will be appreciated as the ensuing description proceeds, that fiber webs made in accordance with the method disclosed in the aforesaid copending application, Ser. No. 79,287, are also usable with the subsequent method steps of the present invention, as are carded webs and webs prepared by other processes.

As shown in FIG. 1, multiple slivers 11 of textile fibers are drawn from their respective supply cans (not shown) into a draw frame 12 which comprises a series of pairs of grooved rolls 13; the rolls of each pair being driven by appropriate gearing (not shown, but well known in the art) at a peripheral rate of speed somewhat faster than the rate of operation of the preceding pair. Merely by way of example, the pairs of rolls 13 may be adjusted to provide an over-all increase in speed and, therefore, an extent of fiber draw on the order of 15:1 through the draw frame 12. As the juxtaposed slivers pass through draw frame 12, the individual fibers are drafted and spread out to form a flat, striated web of substantially alined fibers as shown at 14. Web 14 is maintained adjacent a supporting conveyor sheet 15 on the surface of which adhesive has been previously applied in a preselected pattern.

In this embodiment, the conveyor sheet 15 comprises an endless conveyor belt treated on at least its upper surface with a release agent. One example of such a belt comprises woven glass fiber with a surface coating of tetrafluoroethylene resin. Other examples of release coatings are well known, and comprise such materials as silicones, fatty acid metal complexes, certain acrylic polymers, and the like. Heat resistant films or thin metal sheets treated with release agents may also be used as the carrier sheet.

Prior to the time the web 14 is picked up by the belt 15, the latter has imprinted on its release-treated surface a pattern of flexible, thermoplastic adhesive such as is shown at 16 in FIG. 2. It will be understood that, as shown in FIG. 1, the adhesive is actually on the underside of belt 15 which becomes the upper surface after passing around roll 17, at which time the adhesive pattern 16 directly contacts the fiber web 14. The pattern is shown as being visible in FIG. 2 only for illustrative purposes.

The belt 15 is fed around roll 17 at a speed slightly in excess of the delivery speed of the final pair of rolls 13 of draw frame 12 in order to maintain web 14 under slight tension, whereby the individual highly-drafted fibers are retained in their alined and tensioned condition. Drive rolls 18, 19 are rotated (by suitable drive means, not shown) to drive belt 15 at a speed sufficient to maintain the proper tension on the web 14.

In the method shown for applying adhesive, the belt 15 is fed through a nip formed between a printing roll 20 and a back-up roll 21 maintained in very light pressure engagement therewith. The surface of printing roll 20 is provided with an intaglio pattern to which adhesive may be supplied in various ways well known to those skilled in the art. For example, in the aforesaid parent application, Ser. No. 769,959, now abandoned, a system is schematically disclosed wherein the lower portion of the printing roll 20 picks up adhesive directly from a dip pan, with excess adhesive being removed by a doctor blade, thus leaving only the intaglio patterned surface filled. However, in the practice of the present invention, it has been found that more satisfactory results are obtained by pumping or otherwise transferring adhesive 22 from a supply pan 23 to a reservoir located immediately above an inclined doctor blade 24—the reservoir being defined in part by the upper surface of the inclined doctor blade and the adjacent portion of the rotating peripheral surface of the printing roll 20. Thus, as the printing roll 20 rotates (in a counterclockwise direction as viewed in FIG. 1), the intaglio patterned surface thereof is filled with adhesive 22, excess adhesive is removed by the doctor blade 24, and a metered amount of adhesive is then transferred to the underside of release coated belt 15 in a preselected patern forming a discontinuous layer. The pattern shown in FIG. 2 is in the form of an open diamond pattern of adhesive.

The particular form of the adhesive layer or dimensions of the intaglio pattern employed and, indeed, whether the layer is continuous or discontinuous are not critical to the practice of the invention in its broadest aspects. Thus, it has been found that a continuous layer of adhesive may be used as disclosed for example in the aforesaid application 856,793, now U.S. Pat. No. 3,720,554, provided that the fibers are embedded therein at spaced points. Alternatively, patterns other than the illustrative diamond pattern hereinabove referred to can be utilized, and certain of such patterns will be subsequently described in connection with FIGS. 24–27. For illustrative purposes, however, it is noted that excellent results have been achieved where a diamond pattern was employed in which adjacent lines of adhesive were spaced apart in both directions by ¼", and wherein the intaglio printing roll 20 had adhesive cells or lines 0.007" deep and 0.025" wide.

Since the surface of belt 15 is treated with a release coating, the adhesive remains substantially on the surface with no penetration therein and is preferably in a somewhat tacky condition. The printed belt is drawn from the printing nip around roll 17 positioned closely adjacent the output end of draw frame 12 and, as stated above, at a speed slightly in excess of the delivery speed of the last two rolls in the draw frame. The web 14 emerging from the draw frame 12 is deposited on the tacky adhesive 16 on belt 15 and held in tensioned engagement therewith by the adhesive and the above-mentioned speed differential. This continuous tension prevents the fibers in the web from losing their highly-drafted and alined condition.

In practicing the method of the present invention, additional alined and highly-drafted fibers may be added to the web 14 on the adhesively printed belt 15. For this purpose, a second draw frame 25 similar to the draw frame 12 is provided to draw additional slivers 26 of fibers from their supply cans (not shown) and, after drafting and alining them, to deposit the fibers on the moving web 14 carried by the belt 15. In such cases, the amount of adhesive printed on the belt 15 may be increased to insure that some of the adhesive in the adhesive pattern 16 penetrates the fibers of web 14 drawn from the draw frame 12 and reaches the fibers drawn from slivers 26 which pass through the second draw frame 25. The arrangement is such that the adhesive contact between the fibers drawn from slivers 26 and the pattern 16, together with the speed differential of the belt 15 relative to the last pair of rolls in the draw frame 25, maintains the fibers drawn from slivers 26 under slight tension, whereby they also maintain their highly-drafted and alined condition.

It is another aspect of the present invention that the fibers deposited on the web 14 from draw frames 12 and 25 need not be the same kind, size, color or quantity. Nor, for that matter, do the fibers of the slivers 11 and 26 need to be uniform in these respects as they are drawn into the draw frames 12 and 25. Thus, various blends of fiber sizes, kinds, colors and quantities can be deposited across the web 14 from each of the draw frames 12 and 25 and in various combinations of first and second layers of fibers. Additional draw frames can also be employed if desired.

Further in keeping with the present invention, the fibers from each of the draw frames 12 and 25 pass under respective bars 27 and 28 before being deposited on the belt 15. The bars 27, 28 may be oscillated in a direction generally transverse to the movement of the web 14 and, preferably, provision is also made for controlling the frequency and amplitude of the oscillation of one bar relative to the other. Thus, as each bar is oscillated, the fibers deposited from the respective draw frames 12 and 25 take on a generally sinusoidal or sawtooth wave pattern of controlled frequency and amplitude. A simple, but somewhat similar, oscillating bar arrangement is disclosed in the aforesaid U.S. Pat. No. 3,553,065. However, the single bar arrangement there disclosed did not afford, nor even contemplate, the significantly improved attributes made possible by the present invention.

An example of the web 14 formed on the illustrative apparatus 10 (FIG. 1) is shown in FIG. 2. As previously mentioned, a series of parallel and diagonally disposed lines of adhesive are printed in criss-cross fashion on the belt 15 to form a pattern 16 of adhesive having substantially open spaces in the configuration of diamonds. In depositing the fibers from the first draw frame 12, the bar 27 was not, in this instance, oscillated. Thus, the fibers making up the first component 14a of the web 14 are substantially all alined in the direction of web movement. The fibers making up the second component 14b of the web, however, will be seen to be deposited in a generally wavy or saw-tooth pattern as a result of oscillation of the bar 28 associated with the second draw frame 25, thus altering the appearance characteristics of the finished fabric. In addition, oscillation of the bars 27 and/or 28 serves to alter the structural and functional characteristics of the fabric in that a controllable percentage of the fibers may be deposited on the open adhesive pattern at an angle to the machine direction. It has been found that such fibers do not interfere to any significant extent with the subsequent fiber looping steps of the present invention. Moreover, it is believed that the presence of such fibers extending at an angle to the machine direction serves to increase the cross-directional strength of the fabric being produced by actually increasing the number of oriented fibers which extend partially in the fabric cross-direction. Preferably, in the practice of this aspect of the present invention, when both bars 27 and 28 are oscillated they are oscillated in out-of-phase relation to one another so as to cause fibers in one web component 14a to cross fibers in the other web component 14b at even greater angles while simultaneously maintaining the fibers in a highly oriented state. It will, of course, be understood that the phase and amplitude of the oscillated fiber pattern may be selectively adjusted and controlled to provide a controlled angular deposition of fibers on the open adhesive pattern 16, thus enabling control of the cross-directional strength characteristics of the fabric resulting from fiber oscillation. This will, of course, vary dependent upon various other parameters such, for example, as the type of fibers employed, the type of adhesive employed, fiber-adhesive ratios, gathering ratios, and indeed, the particular end use to which the fabric is to be put. Consequently, in many instances it may not be desirable to oscillate either bar 27 or 28. It should be appreciated, of course, that FIG. 2 is only intended to be illustrative and, while the lines representing the fibers for both components 14a and 14b are spaced apart for clarity, in practice the highly-drafted fibers of both component are very close to one another.

Also for illustrative purposes, it will be noted that web component 14b has three bands of fibers designated color. These bands of fibers may be the same or different colors; but, in any event, they differ from the color of the balance of the fibers of web component 14b. Further, as previously mentioned, the fibers of web component 14b may differ from those of component 14a in kind, size, color or quantity depending upon the desired color pattern and surface characteristics of the final product, as more specifically described below.

Following deposit of web components 14a and 14b on the adhesive printed belt 15, the belt is drawn around a heated curing drum 29 where fusing and curing of the adhesive is substantially completed while the web 14 is maintained in firm contact therewith to bond the individual fibers. To insure effective heating and fusing of the adhesive, it is desirable that travel of the combined belt and web be around a substantial portion of the drum 29. In the illustrated embodiment, a fly roll 29a is positioned to apply tension on the combined belt and web as they travel around the drum 29 to insure complete embodiment of the fibers in the adhesive. The fibers of the web 14 are thus bonded together while retaining their highly-drafted and substantially alined condition in the particular pattern in which they were deposited on the open pattern of adhesive 16 printed on the belt 15.

After leaving the fly roll 29a, the combined web 14 and belt 15 are preferably passed over the drive roll 19, which also serves as a cooling drum, to set the adhesive. The bonded web 14 is stripped from the release-coated surface of the belt 15 by the guide roll 31 as the web leaves the cooling drum 19.

While various well-known adhesives may be employed in the foregoing process, advantages reside in the use of plastisols, which are colloidal dispersions of synthetic resins in a suitable organic ester plasticizer, and which, under the influence of heat, provide good binding power while remaining soft and flexible. While many adhesives of this type are known, those found particularly useful for incorporation in the product of this invention include vinyl chloride polymers, and copolymers of vinyl chloride with other vinyl resins, plasticized by organic phthalates, sebacates, or adipates. These provide a fast curing plastisol adhesive characterized by relatively low viscosity, low migration tendencies, and minimum volatility. Such adhesives remain flexible after curing, and can be activated to a softened, tacky plastic state by subsequent heating.

It has been found that other adhesives may be employed in the process—for example, organisols utilizing resins such as the vinyl chloride polymers and copolymers. Furthermore, still other adhesives may be employed provided that they satisfy specified characteristics in the base web produced in the web forming section 10, and in the finished fabric produced in the adhesive compacting and fiber looping section 30 (FIG. 1). In general, such adhesives should be applied to the base web by procedures which will not disarrange the fibrous structure of the web; such adhesives should heat-set at temperatures below the degradation temperature of the fibers in the base web 14 to secure bonding of the fibers to the adhesive; such adhesives should be reactivatable in the subsequent adhesive gathering and consolidation stage of the process; and such adhesives should form a flexible backing layer for the finished fabric and should strongly bond the fiber loops in place. For example, emulsions of thermoplastic resins such as acrylics and rubber-like compounds, illustratively ABS, have the requisite properties to serve as the bonding adhesive for the web 14.

In carrying out the present invention, the base material, made as heretofore described and comprising a web 14 of highly-drafted fibers embedded in adhesive herein shown in an open pattern, is fed into the adhesive gathering—consolidating and fiber looping section 30 of the apparatus shown in FIG. 1. As shown here, the web 14 continues directly from the web forming section 10 to the consolidating and looping section 30. It should be appreciated, however, that the web 14 discharged from section 10 could be rolled up for storage or transport and then subsequently unrolled and fed into section 30. Also, as previously mentioned, other webs such, merely by way of example, as those made in accordance with the methods disclosed in the aforesaid copending application, Ser. No. 79,287 and U.S. Pat. No. 3,553,065, can be further processed in section 30 in keeping with the method of the present invention.

As illustrated in FIG. 1, the web 14, while still under tension, is fed around an idler roll 32 and on to the surface of a heated forming drum 37. In its preferred embodiment, the drum 37 is made of metal with a highly polished, chromium plated surface which is heated and maintained at a temperature of approximately 250° F. Also, the web 14 is arranged to travel a substantial distance around the drum 37 with the adhesive 16 in contact with the heated drum surface. As the web 14 is fed onto the drum 37, the heat from the drum surface reactivates and softens the adhesive printed on the underside of the web, causing it to be tacky and to adhere slightly to the drum surface, thereby maintaining the web under constant tension. The drum temperature, which is maintained at about 250° F., is, however, maintained below the melting point of the adhesive to prevent dispersion of the adhesive into the fibers of the web.

Pursuant to an important aspect of the invention, the web 14 of fibers and softened, tacky adhesive is reformed by the cooperative action of the drum 37 and a gathering blade 38 having a flat edge 39. The blade edge 39 operates to gather or consolidate the adhesive 16 into a substantially continuous backing layer of adhesive, while simultaneously outwardly looping the fibers of the web between the points of their embedment spanning the open spaces in the original adhesive pattern. The reformed and consolidated material 40 then leaves the blade edge 39 and moves onto a flat take-off surface 41 and a discharge conveyor 52.

Turning now to FIGS. 7–9, the method of making the novel high-loft, nonwoven fabric 40 of the present invention will be explained in greater detail in connection with an illustrative sequence of the gathering and looping of a single fiber of the web 14 and the consolidation of its two original points of adhesive attachment in the adhesive 16. As seen in FIG. 8, the fiber has a portion P which extends across the open space of the diamond pattern of adhesive 16 from point A to point B where it is embedded in the adhesive. Referring to FIG. 7, the series of views in this Figure illustrates how the portion P of the fiber is formed into a loop; viz., when point A being carried around the heated drum 37 impinges against the gathering blade edge 39, its forward motion is halted and it is scraped along the surface of the drum, while point B continues to advance with the drum surface since, due to its softened and tacky condition, it adheres to the smooth drum surface. As point B advances relative to point A, the portion P of the fiber between points A and B is caused to bow outwardly from the drum surface. Finally, point B overtakes point A and these points of adhesive are substantially consolidated as seen in FIG. 9. In the meantime, fiber portion P has been looped outwardly from the drum surface.

It will, of course, be understood that while looping of fiber portion P is occurring, additional adhesive points C–D, etc., travelling around the drum 37 impinge against the gathering blade edge 39 causing a consolidation of these adhesive points and looping of their intermediate fiber portions $P_1$ as is also indicated in FIG. 9. This occurs simultaneously at all points across the web at the blade edge, producing a substantially continuous backing layer of adhesive from which extends the multiplicity of loops formed by the fibers of the base web. The thus formed substantially consolidated layer of adhesive is carried away from the blade edge 39 along the take-off surface 41 and provides a substantially continuous backing layer for the outwardly looped fibers, thus producing the fabric 40.

While in the preferred form of the invention disclosed and claimed herein, it is desired to achieve substantially complete consolidation of the adhesive into a continuous backing layer, in practice it has been found that the degree of consolidation varies randomly throughout the substantially continuous backing and, therefore, it is possible to draw the fabric slightly, thus producing a substantially continuous adhesive backing layer with random openings therethrough. Since complete consolidation, while desirable, is not necessarily attained in the practice of the broadest aspects of the present invention, the degree of consolidation is defined herein, and in the appended claims, in terms such as "to consolidate" the "open adhesive pattern into a substantially continuous adhesive layer." Thus, those skilled in the art will appreciate that terms such as "consolidate and gather" as used herein and in the appended claims are intended to connote an arrangement for consolidating, gathering or compacting the adhesive into a substantially continuous adhesive backing layer—albeit that such "substantially continuous backing" will be nonuniform in thickness and may have, and often will have, small random fissures and gaps therein—all as distinguished from the arrangement disclosed in the aforesaid copending application, Ser. No. 820,224, now U.S. Pat. No. 3,687,754, wherein an open adhesive pattern is only partially consolidated to minimize bonding of adjacent lines of adhesive and thus form a discontinuous adhesive backing layer characterized by its elasticity and/or stretchability.

Another important feature of the invention is that not only does each fiber portion P loop outwardly from the drum surface but, also, as the loop is formed it turns, reaching a position in the fabric 40 generally perpendicular to the direction of the original alinement of fiber portion P. Thus, the fiber loops arrange themselves so that the plane of each loop is substantially normal to the original fiber alinement shown in FIG. 8. The reason for the loop twisting as it is formed may be explained by this observation. If two spaced points of a single fiber not in a web are brought together, it has been observed that the fiber will form a loop and, as the loop is formed, it twists towards a position of minimum internal stress, turning through an angle which tends to approach 180°. In carrying out the method of the invention, because of the great number of fibers in the web and their proximity one to another, each fiber loop engages the neighboring fiber loops with the result that all the loops are blocked from turning beyond the plane substantially normal to the machine direction, and are constrained in that position by the interference between the loops. In practice, of course, the actual direction and degree of loop twist depend upon the characteristics of the fibers in the original web 14. The arrangement of the loops normal to the machine direction is clearly evidenced by reference to FIG. 11, which is a reproduction of an enlarged photograph of a transverse sectional view of the fabric shown in FIG. 10, made in accordance with the method of the invention. The fiber loops and their attachment to the adhesive layer appear in FIG. 11, while in FIG. 12, which is a sectional view taken parallel to the machine direction and, thus, at right angles to FIG. 11, the fiber loops are viewed from their edge and, for the main part, are not discernible in this view as loops.

It is important to note, however, that throughout the fabric the heights of the fiber loops vary according to the spacing between the points of attachment of each fiber to the adhesive pattern in the base web. Referring to FIGS. 4, 8 and 9, it will be seen, for example, that the loop formed by the fiber portion $P_1$ between the points of adhesive attachment C, D will have a lower height than the loop formed by the longer fiber portion P between the points A, B. On the other hand, however, successive loops in adjacent diamonds, when viewed in a vertical section taken along the machine direction (FIG. 5), will have the same height since the fiber length P will remain the same between successive sets of points A, B. This results in a dense fabric with the lower loops supporting and filling around the higher loops and the top surface of the fabric being formed by the tops of the higher loops.

The appearance of a fabric so constructed depends not only on the height of the fiber loops but, also, on the type and denier of the fiber used in the base web, and one of the features of the invention is that the depth of the fabric and the evenness of the surface may be varied by adjusting selected ones of the control parameters, as will be explained below. In general, it may be said that for both relatively low and moderate height high-loft materials which have been produced with the method of this invention, the fabric appears to have a uniform thickness with a somewhat uneven surface texture. With very deep high-loft fabrics, particularly those made from flexible, low denier fibers, the higher loops tend to lay one over the other, thus providing a very soft, napped, fuzzy, fibrous surface. For usages where a more uniform surface texture is desired, moderate height and deep high-loft fabrics made according to this invention may be shorn at some intermediate height as hereinafter explained in greater detail. In such cases, a higher percentage of the fibers will extend outwardly from the backing layer fully to the finished surface of the fabric and the fabric then has a cut-pile appearance.

The following three specific examples of fabrics made by carrying out the method of this invention illustrate the effect of varying one of the control parameters; in this case, the angle of the edge of the blade 38 relative to the drum 37. Referring to FIG. 6, it will be seen that the blade edge 39 forms an angle α with the line T tangent to the surface of the drum 37. It has been found that the blade edge angle α is one parameter that determines the depth of the fabric produced and the degree of uniformity of consolidation of the adhesive backing layer.

As a result of trying different blade angles, it has been determined that the preferred blade edge angle α when dealing with adhesive patterns having lines of adhesives spaced approximately ¼" apart is between about 17° and about 34°. With blades having edge angles within this preferred range, fabrics have been produced which are characterized by having a high degree of uniformity of consolidation of the adhesive backing layer which is substantially void of fissures or gaps and, by having a dense, regular mass of loops that provide a textured, somewhat uneven surface.

With blades having edge angles α less than 17°, difficulty has been experienced in obtaining a uniformly consolidated adhesive backing layer. This appears to be the result of insufficient relief between the blade edge and the drum surface for the fabric to flow evenly and smoothly off the drum surface as the result of the action of the blade, which produces varying degrees of consolidation of the adhesive and a non-uniform layer with fissures and gaps and scattered areas where the looping is irregular, tending to spoil the surface appearance of the fabric. With blades having edge angles α substantially above 34°, both the problem of non-uniform adhesive consolidation and poor loop formation has been experienced. There is also a tendency as the angle α of the blade edge is increased substantially above 34° for the fabric to be formed with pronounced ridges, which may be undesirable in the finished product.

Now turning to the three Examples I–III, the base web was made from 3" staple length, rayon "40" fiber and had a weight as it came off the curing drum 29 of 14 grams/sq. yd. This weight was made up of 7 grams of fiber and 7 grams of adhesive in the base web material. The adhesive was applied in diagonal lines ¼" apart in both directions forming a diamond pattern in which the lines of adhesive were approximately 0.004" deep and 0.025" wide. In the first stage of forming the base web 14, the curing drum 29 was operated at 300° F. and at a surface speed of 24 ft./minute. The base web 14 was thus carried at 24 ft./minute lineal speed to the heating drum 37 which was operated at 250° F., and around the drum to the gathering blade 38. The lip of the take-away surface 41 was positioned tight against the blade edge and less than ¹⁄₃₂" below the corner of the blade edge.

For the purpose of comparing the effect of using blades with different edge angles α, Example I is a fabric produced using a blade with an edge angle α of 17° and, thus, within the preferred range; Example II is a fabric produced using a blade with an edge angle α of 9° and, thus, below the preferred range; and Example III is a fabric produced using a blade having an edge angle α of 74°, and thus above the preferred range.

EXAMPLE I

Figure 13:

FIG. 13 is an enlargement of a photograph taken of the front surface of the fabric to show the surface of the fabric in plan view; the machine direction of the fabric is not indicated but is vertical on the sheet. Many of the loops are clearly visible, as is their orientation generally normal to the machine direction.

Figure 14:
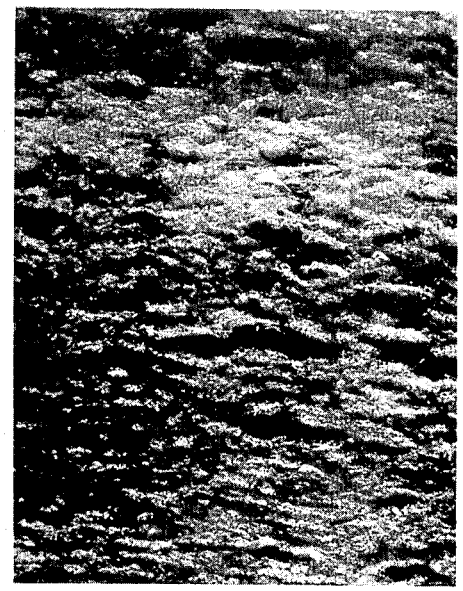

FIG. 14 is an enlargement of a photograph taken of the back of the fabric to show in plan view the exposed surface of the adhesive layer; the machine direction is again not indicated but is similar to FIG. 13. Although a number of fissures or gaps show in the backing layer, the size of these is magnified in the figure and, to the eye, the adhesive layer is substantially uniform and interrupted only by occasional fissures or gaps of up to ¹⁄₁₆" across. In making the fabric of Example I, the take-away speed of the fabric from the blade 38, which is determined by the speed at which the conveyor 52 is operated, was about 2 ft./minute such that the ratio of surface speed of the heating drum 37 to take-away speed of the fabric was about 12:1. By operating the process with a higher ratio up to 15:1, it has been observed that more uniform adhesive consolidation is obtained, while by operating at a slightly lower ratio, i.e., 10:1, somewhat less uniform adhesive consolidation is obtained. By varying this control parameter, therefore, desired adhesive layer characteristics can be obtained.

The weight of the fabric varies in direct proportion to the take-away ratio (assuming the same base web weight). Thus, with a take-away ratio of 12:1 and a 14 gram/sq. yd. base web, the finished fabric will have a weight of about 168 grams/sq. yd.

EXAMPLE II

Figure 15:

The fabric evidences the effect of reducing the angle α of the blade edge such that the small relief angle between the blade edge 39 and the drum 37 interferes with the smooth flow of fabric 40 over the blade 38. As shown in FIG. 15, which is an enlargement of a photograph of the front surface of the fabric to display it in plan view, the fiber loops are formed irregularly or the fibers are formed into clumps instead of loops as desired. The swirled area G on FIG. 15 is such a clump.

Figure 16:
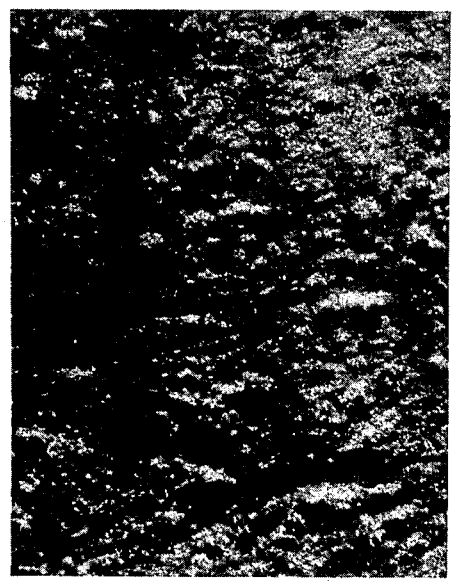

Referring to FIG. 16, this is an enlargement of a photograph of the back side of the fabric, and shows the fabric to have larger fissures or gaps in the adhesive than are present in the more uniformly consolidated adhesive layer of the fabric of Example I (FIG. 14). These fissures or gaps (ranging on the order of 1/16"-1/8" across) in the adhesive layer as shown in the photograph may in some cases be substantially wider (up to 1/2") and, with the irregular loop formation on the surface of the material, represent imperfections which may make the fabric unsuitable for those specific usages where uniformity in appearance and structure are critical. However, this fabric has a high loft and regular loop formation throughout a large percentage of its total area and may, therefore, have utility for less critical applications.

EXAMPLE III

Figure 17:
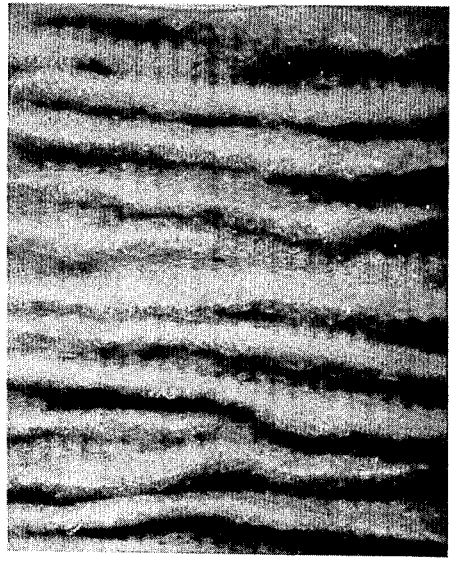
Figure 18:
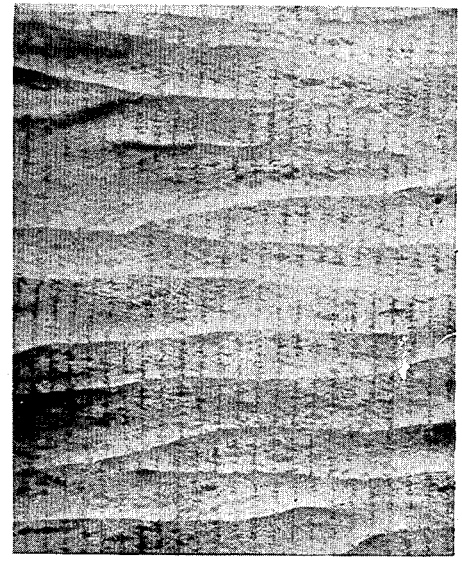

FIG. 17 is an enlargement of a photograph of the front surface of the fabric made, as previously noted, by employing a blade having an edge angle α of 74°. Pronounced ridges transverse to the machine direction are produced as the fabric 40 comes off the blade 38 onto the take-away surface 41 at a more rapid rate than the conveyor 52 removes it therefrom. The fabric alternately builds up in ridges adjacent the blade and is removed by the conveyor. During the periods when the fabric builds up to form ridges adjacent the blade, the loops tend to be formed regularly and, since the adhesive layer is still at that point soft and tacky, the inside facing surfaces of the ridges stick to each other. During periods when the fabric is removed by the conveyor away from the blade, the loop formation tends to be irregular and, thus, as shown in FIG. 18, the loft of the material between the ridges is less, the loops are more irregular, and their mass is less. In FIG. 18, which is an enlargement of the back side of the fabric shown in FIG. 17, transverse lines defining the bottom of the ridges are clearly visible. Because of the pronounced ridges, the bulk of the fabric is considerably greater than the fabrics of Examples I and II where measured to the tops of the ridges in the fabric. This material has utility for applications where bulk is desired, such as insulation, even though it does not have the uniformity of appearance and structure of Example I (FIGS. 13 and 14).

In practicing the method of the present invention and, as evidenced by the foregoing Examples I–III, it has been found that one of the major factors affecting the thickness of the fabric is the loop height as determined and limited by the spacing between points of fiber adhesive attachment A–B, C–D, etc. (FIG. 8). To obtain the maximum thickness of fabric with a given adhesive pattern, the blade edge angle α should be such as to produce not only sufficient consolidation of the adhesive layer to provide good fiber attachment throughout the fabric but, also, sufficient consolidation to insure the production of a maximum number of full height fiber loops. Thus, as the blade edge angle α increases, the condition is approached where the web is being skived off the roll rather than being consolidated and gathered. The fabrics produced with higher blade edge angles α have reduced adhesive consolidation and fabric thickness because fewer loops reach their maximum height. This effect is noticeable in the regions between the ridges of the fabric of Example III (FIGS. 17 and 18) where the loops are less deep than in the material of either Example I (FIGS. 13 and 14) or Example II (FIGS. 15 and 16).

In carrying out the method of the invention using a blade 38 having an edge angle α within the preferred range, it has been found that the fabric loft may be regulated by changing the machine direction dimension of the adhesive pattern. Thus, by increasing this dimension, the height of the loops may be increased, thereby increasing the fabric loft. Larger diameter fibers, strands, or yarns may also be used as the elements of the base web to produce heavier, carpet-like finished fabrics. The adhesive and its pattern of application must, however, take into consideration the amount of adhesive required to form the backing layer under the consolidating action of the gathering blade 38, and sufficient adhesive must be present to provide a substantially continuous backing layer of sufficient thickness to obtain strong attachment of the loops in the finished fabric. More specific disclosures of types of adhesive patterns suitable for use in making carpet-like fabrics of larger diameter fibers, strands, or yarns may be found in the aforesaid copending application of Robert J. Stumpf Ser. No. 856,793, now U.S. Pat. No. 3,720,554, and the aforesaid copending application of Herman G. Minshell, Robert J. Stumpf and William J. Mattes, Ser. No. 77,840, now U.S. Pat. No. 3,729,353, both of which are assigned to the assignee of the present invention.

Now turning to a consideration of a different control parameter—*viz.*, the location of the take-away surface 41—the preferred location of the take-away surface is, as shown in the extreme right-hand view in FIG. 7, tight against the blade 38 and even with the outside corner 39' of the blade. With the surface 41 in this preferred location, the fabric photographically depicted in FIGS. 10, 11 and 12 was produced. This fabric has a moderately even surface texture and a dense mass of loops forming a deep, high-loft pile. It was produced from a base web similar to the base web used for the preparation of the fabric Examples I–III; *viz.*, a highly drafted web of rayon "40" fibers having a weight of approximately 14 grams/sq. yd. The blade edge angle α was 17° (i.e., within the preferred range), and a slow rate of removal of the fabric from the blade edge 39 was used such that the take-away ratio was greater than 15:1 and provided a highly consolidated adhesive backing layer and uniform depth of fabric.

It has been found that by lowering the take-away surface 41 a distance "Y" (FIG. 7) from its preferred location, the structure of the fabric will be drastically affected. Referring to fabric Examples IV (FIGS. 19 and 20) and V (FIGS. 21 and 22), these Examples show that the bulk of the fabric may be increased substantially by lowering the take-away surface 41. The effect of lowering the surface is somewhat similar to the effect from using a blade 38 with an edge angle α substantially above the preferred range in that pronounced ridges are also produced in the fabric, thereby increasing its bulk. But, whereas in fabric Example III (FIGS. 17 and 18) the fabric is distinctly thinner between the ridges, in fabric Examples IV and V produced with a lowered take-away surface 41, the thickness of the pile between ridges remains uniformly deep and a much bulkier material is produced. The amount that the take-away surface is lowered does clearly affect the degree of bulking, and it is apparently the case that as the distance "Y" increases, the fabric bulk increases.

EXAMPLE IV

Figure 19:
Figure 20:
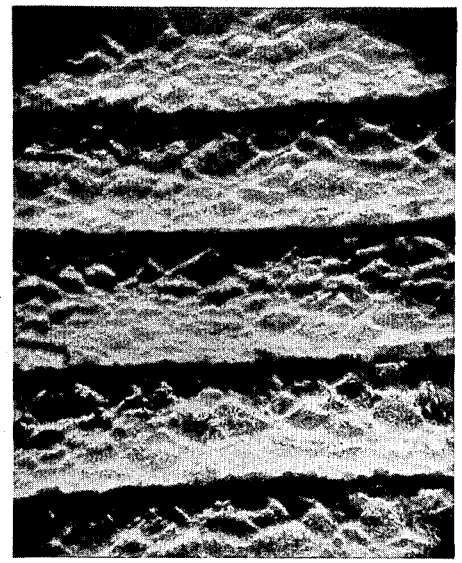

Referring to FIG. 19, the fabric illustrated in top plan view in this photographic reproduction is made from a base web 14 of rayon "40" fibers similar to that used for preparing fabric Examples I–III. The location of the take-away surface was lowered a distance "Y" (FIG. 7) of approximately 5/8 inches and the fabric produced has 2 1/2 to 3 ridges/inch and a weight of approximately 590 grams/sq. yd. As shown in FIG. 20, which is a plan view of the underside or back of the fabric, the bottoms of the ridges or pleats are clearly defined by transverse lines. Lowering the take-away surface 41 causes the fabric as it flows from the blade edge 39 to drop down to the take-away surface and collect there in deep folds or pleats before it is removed by the action of the conveyor 52. In FIG. 19 the fiber loops are clearly evident. This material has, of course, transverse ridges throughout its length and they are clearly defined and distinguishable from the adjacent pleats in the finished material. The surface of the fabric is soft and fuzzy.

The foregoing Examples I–IV illustrate the effect of varying two of the control parameters—*viz.*, the blade edge angle α and the position of the take-away surface 41—both of which directly affect fiber looping and adhesive consolidation at the blade edge 39 due to the gathering function that the blade 38 performs. A further related parameter that affects the gathering function of the blade is the take-away speed of the fabric from the blade edge. With blade 38 having an edge angle $\alpha$ within the preferred range, and a take-away surface at the preferred location, the take-away speed is desirably regulated to remove the newly formed fabric at the rate at which it is being formed, and it has been found that under these conditions the normal ratio of the surface speed of the heating drum 37 to the take-away speed will be about 12:1. By increasing the ratio up to, for example, 15:1, by slowing down the fabric take-away speed, more uniform adhesive consolidation has been obtained while the mass of the fiber loops is made somewhat more dense, so that a fabric with a higher weight has been produced. By increasing the fabric take-away speed, such that the fabric is not allowed to gather at the blade edge 39, the fabric will be drawn or extended while the adhesive layer is still in a plastic condition, thereby opening the adhesive layer, thinning the fabric pile, and reducing the weight of the finished material.

As illustrative of the effect of lowering the take-away speed and thereby increasing the take-away ratio, a fabric having high weight and bulk was made as set forth in the following Example.

EXAMPLE V

Figure 21:

The fabric of this Example, shown in top plan view by the photographic reproduction appearing in FIG. 21, was formed by using a take-away surface dropped ⅞ inches below the preferred location (Y=⅞ inches) and by reducing the take-away speed of the finished fabric. This produced a pleated, bulky fabric. The folds or pleats have less height than in the fabric of Example IV and are less frequent, occurring approximately 1½ ridges/inch. The fewer pleats per increment of length is a result of lowering the take-away speed even though the take-away surface was lower than in the previous Example IV. But this fabric has a particularly deep loft and an extremely fleece-like surface with the loops of fibers having maximum height. The nap is deep, the surface is fluffy and soft, and the fibers are less securely attached to each other and to the adhesive layer than in the case of Example IV. The soft, fluffy material has a weight of 890 grams/sq. yd.

Figure 22:
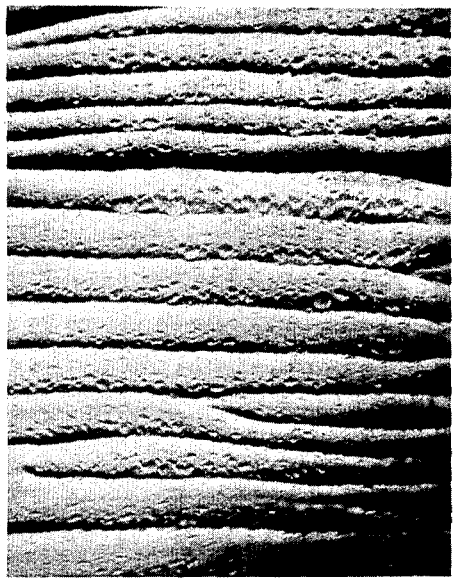

As shown in FIG. 22, which photographically illustrates this material from the underside, the lowering of the take-away surface 41 has not interfered with obtaining a substantially uniformly consolidated adhesive backing layer. In this case the adhesive layer is shown to be interrupted by the ridges but, otherwise, it is a substantially solid consolidated backing layer.

Certain of the foregoing Examples—viz., Examples III, IV and V—illustrate certain adjustments in parameters which may be made to achieve various forms of corrugations or ridges in the finished fabric. Example III (FIGS. 17 and 18) illustrates the production of a corrugated fabric by increasing the blade edge angle $\alpha$ which results in a somewhat irregular loop formation and a high bulk material. Example IV (FIGS. 19 and 20) illustrates a fabric with regular loop formation and high bulk due to corrugations produced as a consequence of lowering the take-away surface. Example V (FIGS. 21 and 22) demonstrates that as the take-away speed is reduced, fewer corrugations will be produced even where the take-away surface is lowered, but the fabric has high bulk and weight.

It will thus be seen that by selection of the blade edge angle $\alpha$, take-away ratio, and the height of the take-away surface 41, the fiber looping, fabric pleating plus bulk and basis weight of the fabric may be controlled to produce a product of desired characteristics.

Further parameters that affect adhesive consolidation and fiber looping at the blade edge 39 are: (1) the adhesive pattern applied to the fibers in the formation of the base web 14; (2) the adhesive weight as a percentage of the weight of the web; (3) and the area of the web covered by the adhesive pattern. The adhesive was applied in the preparation of Examples I–V in the form of diagonal lines, criss-crossed, to provide an open diamond pattern with the size of the opening in the diamond in the machine direction being less than the lengths of the fibers used for the base webs. Thus, where rayon "40" was used, with fiber lengths from ½ inches to 3 inches, a ¼ inch diamond pattern applying adhesive to 20% to 25% of the total web surface was found effective.

Other adhesive patterns which may be used include unevenly spaced lines of application, such as criss-crossed sine waves 80 as shown in FIG. 24. The spacing of such lines of adhesive may furthermore be increased or decreased to change the maximum height of the element loops and, thus, the depth and surface texture of the finished material.

When criss-crossed lines of adhesive are used, the loops of the fabric will have varying heights due to the different spacings of the points of attachment (A–B, C–D—FIG. 8) of the base web elements to the adhesive. To produce a fabric with loops of uniform height, the adhesive is applied to the base web 14 in lines evenly spaced apart and extending across the web. Furthermore, the spacing between the lines of adhesive may be increased or decreased to obtain a higher or a lower pile height, as desired. Referring to FIG. 25, one such adhesive pattern is illustrated in the form of evenly spaced diagonal lines 82. Another such adhesive pattern is illustrated in FIG. 26, in the form of lines 84, each in the shape of a sine wave. A brick-like pattern is another such pattern as shown in FIG. 27. If broken lines of adhesive are utilized to obtain element looping—such, for example, as the brick-like pattern of FIG. 27—the gaps in the lines of adhesive 86 should be staggered so that the web elements longitudinally span the spaces between the adhesive lines and are securely attached to the adhesive.

When the spacing of points of attachment of the fibers to the adhesive varies regularly over the area of the base web as, for example, when an open diamond pattern of adhesive is used, the loops in the finished fabric will vary in height in a regular manner to provide a uniformly varying surface having a textured appearance. When, on the other hand, an open pattern of adhesive is used in which, in the cross direction of the base web 14, the lines of adhesive are parallel, or evenly spaced, it will be seen that the spacing of points of attachment of the elements to the adhesive will be uniform over the total area of the fabric, and the loops in the finished fabric will be of uniform height to provide a more even surface. The appearance of such a surface will, of course, be affected by the characteristics of the elements which form the loops. Thus, where the elements are yarn or heavy strands of fibers such, for example, as disclosed in the aforesaid copending application of Robert J. Stumf, William J. Mattes and Herman G. Minshell, Ser. No. 77,840, now U.S. Pat. No. 3,729,353, the loops will be clearly visible, while where the elements are small diameter, flexible fibers, the surface will have a fibrous appearance, the fiber looping being less evident.

It has been observed that the transverse adhesive lines, when consolidated by the action of the gathering blade 38, are moved into proximity or abutment with each other and, being in a soft tacky state due to the high temperature of the heating drum 37, tend to bond to each other. However, the bond between lines of adhesive may be broken and the open pattern of adhesive substantially restored by drawing the fabric in the machine direction after the adhesive backing layer has been cooled, all as more clearly described in the aforesaid copending application Ser. No. 820,224, now U.S. Pat. No. 3,687,754. It may thus be demonstrated that the backing layer, while it appears to be continuous in the finished fabric, actually comprises lines of adhesive extending in the cross direction of the fabric and bonded to each other.

In the application of the adhesive to the base web, it has been observed that by increasing the adhesive viscosity, a sharp, distinct printed pattern will be obtained such that the fibers are securely attached to the adhesive at distinct spaced points and are not embedded in adhesive throughout their length. It is desired to have spaced points of fiber adhesive attachment so that the fiber loops will be distinctly and separately formed at the gathering blade in such a manner as to extend outwardly from the adhesive bonding layer. Fiber sizes between 1½ denier and 15 denier have been successfully utilized in the base web 14 with a ¼ inch diamond pattern of adhesive. With higher denier fibers, or with strands or yarns used in the preparation of the base web, the adhesive pattern is preferably enlarged or adhesive utilized in the form of a continuous layer, illustratively as disclosed in Ser. No. 856,793, now U.S. Pat. No. 3,720,554, with the points of fiber, strand or yarn embedment being spaced at somewhat larger distances, so as to improve the continuity of the adhesive backing in the fiber product and so as to insure attachment of the fibers or strands to the adhesive at spacings along the length thereof which will define the depth of pile or degree of loft in the finished material. With the light-weight webs of rayon used for the formation of the fabrics of Examples I–V, the ratio of fiber to adhesive was approximately 1:1. It has been found that the degree of adhesive fiber attachment in the base web was affected when the fiber-to-adhesive ratio with such type fibers was substantially increased above 1:1, so that the fiber loops did not form properly at the blade 38, nor did the fibers have sufficient attachment to the adhesive layer in the finished fabric. On the other hand, increasing the relative amount of adhesive in the base web had the result of producing a thicker adhesive layer in the finished material and more secure fiber attachment, but the adhesive lines tend to disperse so that the pattern becomes less open, thereby affecting the height of the loops, which is undesirable. The fiber-adhesive ratio will be different, however, for base webs of yarns and threads where it appears that less amounts of adhesive, relatively speaking, will provide adequate attachment of the loops to the adhesive backing layer.

TYPES OF ELEMENTS AND BASE WEBS

While staple length rayon "40" fibers were used for the preparation of the fabrics of Examples I to V, it should be noted that these specific Examples have been presented to illustrate the effect of varying various control parameters on the nature and quality of the finished material without implying that the process is in any way limited to this particular type of fiber. Other fibers that have been used in the process in its preferred form, and which have resulted in fabrics of excellent properties of hand, drape, and appearance, include natural fibers and various synthetic fibers and blends thereof.

For example, acrylic, olefin and polyester fibers have been used, and it is within the contemplation of the invention to use any or all of these fibers by themselves or in blends, as well as natural fibers, acetate, nylon and other synthetic fibers in staple length or in monofilament form, any of which may be used for the preparation of the base web 14. Moreover, not only highly drafted webs and carded webs of staple length fibers may be used for the base web, but, also, garneted and air-laid webs of such fibers as well as directly laid alined webs of monofilament. It has been noted, however, that when webs such as carded webs are used for the base web in which an important proportion of the fibers are randomly oriented, those fibers not alined with the machine direction appear to interfere with the loop production by the gathering blade. The most regular formation of loops with the loops turned normal to the machine direction has been produced with those base webs having the highest proportion of fibers alined with the machine direction as, for example, the highly drafted webs made with the apparatus illustrated schematically in FIG. 1.

It is also contemplated that flexible threads, yarns or strands may be used for forming a base web, provided that the flexibility of such elements is high enough to permit looping of the fibers and turning of the loops in the manner heretofore described. To obtain regular loops of such elements in the finished material, it is clear that substantially all such elements should be parallel and extend longitudinally of the web, for loop formation will be interfered with by those elements that substantially depart from such longitudinal alinement.

It has been found that in order to produce a material fully in accordance with the present invention, the elements should be sufficiently flexible to allow the loops to form and to twist normal to the machine direction while being formed under the action of the adhesive consolidating and gathering blade 38. Thus, neither stiff strands which do not loop under the action of the gathering blade 38, nor multiple strand yarns in which the lay of the strand opposes the tendency of the loops to twist while being formed under the action of the blade, will satisfactorily serve as elements of the base web 14 when it is desired to produce a fabric fully in accordance with the present invention.

It will, therefore, be seen that the features of the finished fabric are determined by the characteristics of the particular elements used in the formation of the base web 14 and, to some extent at least, by the nature of the process used in forming the base web. A further, specific fabric Example VI is illustrative, as shown in FIG. 23.

EXAMPLE VI

This fabric was made from a base web 14 prepared by carrying slivers of rayon fibers alternated with slivers of a combination of rayon and polypropylene fibers into the drafting frame 12 of FIG. 1. By the drafting process, these alternate slivers were spread into bands ½ inches to ¾ inches wide in the base web. Because of the relatively low softening temperature of polypropylene, as the web 14 was carried around the curing drum 29 during the base web formation stage of the process and raised to the temperature of the drum (300° F.), a substantial proportion of the polypropylene fibers were softened and shrunk. In the subsequent adhesive consolidation and fiber looping stage, the bands of polypropylene and rayon fibers were consolidated into dense, thin, hard strips 70 displaying relatively few of the fiber loop characteristics of the neighboring wider bands 72 of 100% rayon fibers, as illustrated in FIG. 23.

One means of utilizing the effect produced by softening or melting such synthetic fibers would be in the preparation of a fabric with a tear strip defined by a thin band of 100% polypropylene or polyethylene fibers which, having been passed over the curing drum 29 and raised to substantially their softening temperature, have been made viscous and reduced to a low tensile strength film. Of course, the fabric of FIG. 23, with its combined polypropylene and rayon fiber strips 70, may be used for its decorative striped appearance.

In the foregoing Example VI, the heat from the curing drum 29 is utilized to soften thermoplastic fibers of the base web 14. It is one of the important features of the invention to utilize heat from the forming drum 37 to heat-set thermoplastic fibers in the web. The temperature of the forming drum is determined by the adhesive utilized and, typically, is maintained at a lower temperature than the temperature of the first stage adhesive curing drum 29 which is provided for the purpose of fusing the polyvinyl chloride or other resin of the adhesive, to thereby secure an adequate bond to the fibers. The temperature of the forming drum 37 is, however, preferably maintained at all times at a level sufficient to reactivate the adhesive and make it tacky so that it will adhere to the drum 37. The forming drum temperature will not only depend on the particular adhesive used but, also, on the operating surface speed of the drum and the distance that the web is maintained in contact with the drum. The degree of heat-set that can be obtained depends on the softening temperature of thermoplastic fibers in the web. Thermoplastic fibers which are heated to their softening temperature will be heat-set into the looped or crimped shape that is imparted to such fibers by the gathering blade 38. The pile of the finished fabric embodying such heat-set fibers has resiliency and resists crushing, so that where these properties are desired, the thermoplastic fibers for the base web 14 should be selected with consideration of their softening temperature and the operating temperature of the forming drum.

It has also been observed that certain types of thermoplastic fibers will be shrunk by exposure to the heat of the curing drum 29 and/or the forming drum 37. Fiber shrinkage will, of course, affect the size of the loops formed by such fibers and, therefore, the appearance of the finished material. Fiber shrinkability at the operating temperature of the curing drum 29 and the forming drum 37 must, therefore, also be considered in selecting the fiber for the base web 14.

ADDITIONAL METHOD STEPS

The method of the present invention, in its preferred form, involves the preparation of an adhesive bonded, highly drafted base web 14, and the adhesive consolidation and fiber looping accomplished by the cooperating action of the gathering blade 38 and the forming drum 37. Additional preliminary steps in the formation of the base web 14, as well as subsequent steps for processing the fabric 40 after it flows from the gathering blade 38, may be optionally carried out to alter the characteristics of the finished fabric.

Preliminary Steps

Referring to FIG. 1, the base web 14, as has been previously described, may be formed of webs from two drafting frames 12, 25 supplied with staple length fibers or monofilament. As an important feature of the invention, patterns of color or of fibers which differ from the main constituent of the fabric may be introduced into the finished fabric 40 by utilizing certain preliminary steps in the formation of the base webs.

For example, the underweb from the first drafting frame 12 may be made from fibers of a solid color while at spaced intervals across the base web 14a bands of one or more colors may be introduced by passing colored fibers through the second draw frame 25 so that the colored fibers are laid on the underweb 14a. The top layer 14b of fibers may be applied in the pattern desired and, it has been found, will effectively screen out the underweb color in most instances so that the finished material will display a striped appearance.

The top layer 14b of fibers from the draw frame 25 may also be introduced in a wavy or saw-tooth pattern to produce either a wavy or saw-tooth effect completely across the fabric, as illustrated in FIG. 2, or in bands across the fabric as desired.

Alternatively, the under layer 14a of the base web 14 may embody different colored fibers by having the fibers at the margins, for example, of one color while the fibers across the center of the web are of a different color or colors. To this end, different colored fibers may be introduced through either or both draw frames 12 and/or 25. The top layer of fibers may be in the form of spaced bands of fibers across the web, or the different color may be introduced through only the second draw frame 25 by laying down a uniform layer of fibers in which at least certain of the adjacent slivers are of different colors. Where the top layer of the base web comprises spaced bands of fibers, it will be appreciated that the finished fabric will have a varying weight across the web, with a double weight and a more dense mass of loops in the bands where the top fibers are laid down.

Other procedures may be used for introducing patterns into the finished fabric. For example, a layer of fibers in the form of a section of a web from the second draw frame 25 may be laid on a web from the first draw frame 12 or onto a carded web underlayer. Due to the consolidation operation performed by the gathering blade 38, the pattern will be shortened lengthwise but not appreciably disarranged laterally, such that whatever the pattern introduced into the top layer of the base web 14, it will appear in the finished fabric in its fore-shortened form. A pattern of fibers may be introduced into the top draw frame 25, which will operate to aline the fibers and will draw or extend the pattern in the machine direction. The subsequent shortening effect by the gathering blade 38 will tend to reduce the pattern to its original form in those instances where the extent of the draw in the drafting frame 25—illustratively 15:1—is approximately the same as the take-away ratio.

Subsequent Steps

As shown in FIG. 1, the fabric 40 is carried along the take-away surface 41 by the action of the conveyor 52. Since the adhesive backing is hot and tacky as the fabric flows onto the take-away surface 41, that surface may be treated with a non-stick or release coating to insure that the fabric may be drawn smoothly along the surface.

To cool the belt of the conveyor 52 and prevent it from becoming overheated from the hot adhesive back of the fabric 40, streams of air may be blown against the underside of the belt from suitably placed air nozzles 54. This will also serve to cool the fabric 40, although it may be necessary or desirable to pass the fabric through a cooling station or zone (not shown) to cool the adhesive and thermoplastic fibers to temperatures below their softening temperatures or to eliminate tackiness of the adhesive.

With fabrics made from thermoplastic fibers such as acrylic fibers, it has been found that with the forming drum 37 operating at about 260° F., the fibers are heat-set in the crimped or looped form produced by the action of the gathering blade 38. As a further process step, and as more fully disclosed in the aforesaid copending application of Robert J. Stumpf, Ser. No. 820,224, now U.S. Pat. No. 3,687,754, such fabric 40 may be pulled or drawn in the machine direction to expand and open the adhesive backing layer. The set in such fibers will tend to return the fabric to its consolidated form, such that the fabric is stretchable and elastic up to a limit of about 100%. The backing layer of the fabric 40 may be perforated as yet another procedure for opening the adhesive layer to provide a stretchable fabric.

In furtherance of the present invention, provision may be made for laminating the fabric 40 to an additional backing layer. To this end, and as best illustrated by reference to FIGS. 28a and 28b conjointly, the fabric 40 may be carried directly from the adhesive compacting and fiber looping section 30 to a laminating station 90 wherein n laminations (where n equals any desired whole integer) may be adhesively bonded to the back of the fabric 40.

For example, in those instances where it is desirable to reinforce the fabric 40 because of the particular end use to which the fabric is to be put, it may be desirable to laminate the fabric to a backing material suchs as an open scrim, indicated generally at 91 in FIGS. 28a and 28b. As here shown, the scrim lamination is drawn from a supply roll 92 and fed around a turning roll 94 into direct face-to-face contact with the compacted adhesive backing layer of the high-loft fabric 40, which backing layer may still be hot and tacky. The scrim layer 91 and fabric 40 are then drawn around a heated drum 95 where the adhesive backing layer on the fabric 40 is reactivated and fusing of the adhesive and the scrim layer 91 is substantially completed while the scrim layer is maintained in firm contact therewith to bond the fabric to the scrim.

To insure effective heating and fusing of the adhesive, it is desirable that travel of the combined fabric and scrim layer be around a substantial portion of the drum 95. In the illustrative embodiment, a fly roll 96 (FIG. 28b) is disposed to apply pressure on the combined fabric and scrim layers as they travel around the drum 95 to insure embedment of the scrim material 91 in the adhesive. The thus laminated fabric 40ₐ, comprising laminations of high-loft fabric 40 and scrim backing 91, may then be passed directly to a winding apparatus, indicated generally at 98 in FIG. 28b, which may take the form of that shown in the aforesaid copending application of Adrian D. Drost, Ser. No. 175,559, now abandoned, which is assigned to the assignee of the present invention, where the laminated fabric 40ₐ is rolled up for storage, subsequent treatment or processing, shipment or other desired end use. In some instances it may be desirable to cool and/or further cure the laminated fabric 40ₐ prior to winding the fabric on a core to form a roll and, in such instances, the fabric need merely be passed through a suitable curing station, indicated schematically at 99 in FIG. 28b, prior to delivery to the winding apparatus 98. A fragmentary portion of the thus formed two-ply, laminated fabric 40ₐ, comprising a lamination of high-loft material 40 made in accordance with the present invention adhesively secured by the adhesive backing layer 16 of the high-loft material to a lamination of scrim 91, is illustrated in FIG. 29.

In certain instances it may be desirable to apply additional adhesive in order to obtain the desired bond to the backing material, in this instance, the layer of scrim 91. To accomplish this, the high-loft fabric 40 may optionally be passed through a nip (FIG. 28a) formed between an adhesive printing roll 100 and a back-up roll 101 maintained in very light pressure engagement therewith. The surface of the adhesive printing roll 100 may be provided with an intaglio pattern in a manner similar to that previously described in connection with the printing roll 20 shown in FIG. 1, with the adhesive 102 being supplied directly thereto from a reservoir 104 disposed above a doctor blade 105. The reservoir 104 is maintained filled by pressurized delivery of adhesive 102 thereto from a supply pan 106. The arrangement is such that an additional adhesive pattern may be applied to the compacted adhesive backing of the fabric 40 just prior to placing the fabric 40 in fac-to-face contact with the scrim 91.

In furtherance of this aspect of the present invention, it may also be desirable to laminate the fabric 40 to a layer of foam rubber 108, either with or without an intermediate layer of adhesively porous, open scrim 91 therebetween, thus producing an improved nonwoven, high-loft fabric 40ᵦ ((FIG. 30) characterized by its thickness and resiliency. To accomplish this, a suitable foam rubber lamination 108 may be drawn from a supply roll 109 about a turning roll 110 and placed in direct face-to-face engagement with either the layer of open scrim 91 as shown in FIG. 28a or, alternatively, the adhesive backing of the novel high-loft fabric 40 itself. Those skilled in the art will appreciate that the latter alternative arrangement, while not shown in the dawings, may be readily achieved by the simple expedient of eliminating the intermediate scrim layer 91. Thereafter, the laminations of high-loft fabric 40 and foam rubber 108, either with or without an intermediate lamination of open scrim 91, are fed about the heated drum 95, optionally through an additional curing station 99, and directly to a winding apparatus 98 in the manner previously described. A fragmentary portion of a three-ply, laminated fabric 40ᵦ comprising an upper ply of high-loft fabric 40 with its adhesive backing 16, an intermediate ply of open scrim 91, and a bottom ply of foam rubber 108, is shown for illustrative purposes in FIG. 30.

In still other instances it may be desirable to produce a laminated nonwoven high-loft fabric in accordance with the present invention which is characterized by having a deep loop pile on both the front and back surfaces, with or without an intermediate ply such as open scrim and/or foam rubber. To this end, a second high-loft fabric 111 (FIG. 28a) made in accordance with the present invention may be fed from a supply roll 112 or, alternatively, from a second adhesive compacting and loop forming section (not shown) of a second high-loft fabric production line identical to that shown in FIG. 1, through the nip formed between an adhesive printing roll 114 and a back-up roll 115 maintained in light pressure engagement therewith and, from there, about turning rolls 116, 118 into face-to-face contact with an intermediate lamination of, for example, foam rubber 108, from where the multi-ply lamination is passed about the heated drum 95, and optionally through a curing station 99, to the winding apparatus 98 in the manner previously described. Of course, those skilled in the art will appreciate that either or both of the intermediate plies of open scrim 91 and/or foam rubber 108 may be preent or, alternatively, can be dispensed with. Thus, the high-loft fabric 40 may be selectively laminated directly to any one or more additional laminations of, for example, open scrim 91 and/or foam rubber 108, and/or a second high-loft lamination 111 (which may be either identical or dissimilar to the fabric 40), and/or to any other desired backing. In many instances the adhesive present on the backing of the high-loft fabric 40 and 111 may be sufficient to provide adequate bonding, in which event the adhesive printing roll 114 may also be eliminated.

There has hereinabove been described a continuous process for forming a high-loft fabric 40 and for subsequently laminating the fabric 40 to one or more additional backing layers, the nature of which will depend upon the desired final characteristics of the product being produced. However, those skilled in the art will appreciate that, in its broadest aspects, lamination of the high-loft fabric 40 to one or more additional backing layers can be accomplished in other than a continuous process. For example, as shown in phantom in FIG. 28a, the fabric 40 may be supplied from a previously wound roll 119, about a turning roll 120 and into the nip between the adhesive printing roll 100 and the back-up roll 101 in lieu of supplying the fabric 40 directly from the adhesive compacting and fiber looping section 30. Of course, with this latter alternative it may or may not be necessary to apply additional adhesive by means of the adhesive printing roll 100 dependent upon the characteristics of the material to which the fabric 40 is laminated and the bond that is desired.

While the broad concept of laminating high-loft, non-woven material to $n$ additional backing layer(s) as part of either a continuous manufacturing process or, alternatively, as part of a discontinuous manufacturing process, does form part of the present invention, this invention is not concerned with details of specifiic laminated high-loft products which find specific commercial applications. Those interested in such applications and/or products are referred, merely by way of example, to the aforesaid copending application of Robert J. Stumpf, Ser. Nos. 77,843, now U.S. Pat. No. 3,689,353, and 78,004, now U.S. Pat. No. 3,705,063, and of Robert J. Stumpf and William J. Mattes, Ser. No. 23,929, now U.S. Pat. No. 3,687,796, which are assigned to the assignee of the present invention.

While the foregoing additional process steps involve treatment of the back of the fabric 40, it is also contemplated that the surface of the fabric 40 may be subsequently processed. It has been previously mentioned that the looped surface of the fabric 40 may be shorn at some intermediate height to provide a cut-pile effect and a more uniform depth and surface texture. To accomplish this, and as best illustrated by reference to FIGS. 31a and 31b conjointly, it will be observed that as the fabric 40 leaves the heated drum 37 and gathering blade 38 in the adhesive compacting and fiber looping section 30, it is passed through a cooling section, generally indicated at 121, which may take the form of the cooling system disclosed in the aforesaid copending application of Adrian D. Drost and Ronald P. Glanz, Ser. No. 170,559, now U.S. Pat. No. 3,714,720, which is assigned to the assignee of the present invention, where the heated fabric 40 and its relatively hot and tacky adhesive backing layer are cooled and cured preparatory to winding the fabric on storage rolls (not shown) or, as here, further treatment of the surface of the fabric. From the cooling section 121, the fabric 40 is conveyed on a take-away conveyor 52 to a shearing apparatus, generally indicated at 122 in FIGS. 31a and 31b. The particular shearing apparatus 122 employed does not form part of the present invention and any suitable commercially available shearing equipment may be utilized. For illustrative purposes, however, the shearing apparatus shown diagramatically at 122 may take the form of a "Mark 50" high speed fabric shearing machine such as is made by Sellers & Co., Ltd., Chapel Hill, Huddersfield, Yorks, England. As the fabric passes successively through the shearing headstocks, generally indicated at 124 and 125 in FIG. 31a, the loops are progressively shorn to provide a finished fabric $40_c$ which may then be delivered to a winding apparatus 98 (FIG. 31b) identical to the winding apparatus 98 shown in FIG. 28b.

Referring to FIG. 4, it will be recalled that where a diamond-like adhesive pattern is utilized or, for that matter, other types of patterns employing nonparallel lines of adhesive, or a continuous layer of adhesive in which the flexible elements are embedded at spaced points, the loop structure which is formed in the adhesive compacting and fiber looping section 30 (FIGS. 1 and 31a) comprises a series of loops which vary in height dependent upon the longitudinal spacing between two points of embedment in the adhesive—viz., the greater the spacing the greater the loop height and, conversely, the smaller the spacing the smaller the loop height. Moreover, it will further be recalled that where the adhesive pattern comprises parallel lines of adhesive, such as shown by way of example in FIGS. 25–27, the resulting fabric 40 will be characterized by having a multiplicity of loops of uniform height formed therein.

Considering first the case where the fabric being shorn in the apparatus 122 shown in FIG. 31a is a fabric having a loop formation similar to that shown in FIG. 4—viz., loops of varying height resulting from the application of nonparallel lines of adhesive—and referring to FIG. 32, it will be noted that as the fabric 40 passes through the first shearing headstock 124 (FIG. 31a) the tips of the tallest loops will be shorn off to a height H–1. As the fabric then progresses through the second shearing headstock 125, loops of intermediate height and the up-standing portions of the already shorn taller loops will be shorn to a height H–2. The resulting fabric $40_c$ will, therefore, be characterized by its smooth cut-pile appearance in which the relatively low loops of fibers remain intact as indicated at 126, with such intact loops being interspersed among vertically upright, free-standing fibers 128 which constitute the remaining unshorn leg portions of the shorn loops which had previously extended to heights above the levels H–1 and/or H–2.

Considering next the case where the fabric 40 comprises an adhesive backing 16 and a series of loops of uniform heights such as result from the application of parallel lines of adhesive, and as best shown in FIG. 33, it will again be observed that as the fabric passes through the first shearing headstock 124 (FIG. 31a) in the exemplary apparatus 122, the tips of substantially all of the loops are shorn, thus producing a fabric having a plurality of vertically upright, free-standing fibers having a height H–1, which fibers constitute the unshorn leg portions of the shorn loops, with the fabric being substantially devoid of any intact loops. As the fabric progresses through the second shearing headstock 125, the shearing action tends to further reduce the height of the fiber portions to a height H–2. The resultant fabric $40_d$ is therefore constituted by a compacted or substantially consolidated adhesive backing 16 and a series of vertically upright, freestanding fibers 128 with the fabric $40_d$ being substantially devoid of loops.

There has hereinabove been described a procedure for sharing the looped face of the novel high-loft, nonwoven fabric 40 of the present invention as part of a continuous process for both making the fabric and treating its surface to form a high-loft, nonwoven fabric with a cut-pile surface. However, as was the case in the laminating procedure previously described in connection with FIGS. 28a and 28b, the invention is not, in its broader aspects, limited to surface treatment of the face of the fabric 40 as part of a continuous manufacturing process. Rather, as shown in phantom in FIG. 31a, the fabric 40 may be supplied from a previously wound roll 119 about a turning roll 120, and from there directly into the shearing apparatus 122 in lieu of supplying the fabric 40 directly from the adhesive compacting and fiber looping section 30.

It is further contemplated that other process steps may be employed to alter the surface characteristics of the novel high-loft fabric 40. For example, the material may be embossed, or sheared in a pattern to provide desired surface texture or appearance. It may further be embossed as disclosed in the aforesaid copending application of Robert J. Stumpf and William J. Mattes, Ser. No. 30,900, now abandoned, which is assigned to the assignee of the present invention, for the purpose of altering its structural characteristics so as to create a fabric which will meet particular use specifications. The fabric 40 may further be dyed or printed, or otherwise colored or ornamented.

The manufacture of molded high-loft fabric and laminates

While according to the foregoing description, the high-loft nonwoven fabric may be applied to a backing sheet to produce a flat laminate, it is also contemplated that the nonwoven fabric may be laminated to sheet materials and molded into simple or complex shaped panels.

Accordingly, laminates of nonwoven fabric and sheet materials may be constructed acccording to this invention not only flat but also in shapes. Thus after nonwoven fabric of the character previously described has been attached directly to a backing sheet of thermoplastic material, for example a sheet of a polyolefin (e.g.—polyethylene, polypropylene, polystyrene), an acrylic (e.g.—acrylonitrile), a vinyl polymer (e.g.—polyvinyl chloride) or copolymers or terpolymers thereof (e.g.—ABS), the laminate may be formed by known methods such as by molding in vacuum thermoforming apparatus, and set in the formed shape. The backing sheet can be a fibrous material rather than a plastic material such as cardboard or fiber board and the laminate molded or pressed into a desired shape by adding moisture and subjecting the laminate to heat and pressure. The adhesive backing layer may be activated by heat or solvent to laminate the nonwoven fabric to the backing sheet, or a layer of additional adhesive applied to the backing layer for laminating purposes, or attachment may be achieved through an intervening layer, illustratively foam or similar stretchable material.

One of the features of the high-loft, nonwoven fabric giving it particular utility for the formation of shaped panels when laminated to a backing sheet, is its stretchable deformability such that it will be drawn and conform to the curvature imparted to the backing sheet in the course of forming without opening undesirable fissures or gaps in the pile surface.

The gathered backing layer when softened to a tacky, plastic state as by heating or the like, will stretch and even partly open to flow with the backing sheet as the sheet is formed. The dense tightly packed fiber loops forming the surface of the nonwoven fabric will shift with the backing layer and adjust to the shape of the forming device. While the adhesive backing layer and dense pile surface may open somewhat particularly in regions of extremely sharp curvature, aesthetically and functionally acceptable shaped panels may be made by the selection of suitable fibers, filaments, strands or yarns and controlling the fabric manufacturing process so that adequate pile density is provided to accommodate the opening which depends on the degree of curvature imparted to the sheet.

As another example of a further process step, since the adhesive of the backing layer is preferably a thermoplastic adhesive which may be reactivated to a tacky, softened plastic state, decorative, shaped panels have been made by applying heat and pressure and molding the high-loft, nonwoven fabric *per se*, as by thermoforming; in such a process step the fabric is drawn to the shape of the mold and upon cooling while maintained in that shape the adhesive backing layer will set and thereby hold the shape to which the fabric is molded. Where the nonwoven fabric has been molded into a three dimensional panel, the panel is self supporting since the gathered thermoplastic adhesive backing layer when set in such a shape provides structural support. If desired, curved panels may be subsequently laminated to a curved backing material or supporting structure of nonflexible material utilizing the adhesive of the backing layer or additional adhesive to laminate the materials throughout substantially the entire interface between the backing layer and the backing material so that the molded nonwoven high-loft material conforms to the backing material or support.

I claim as my invention:

1. A method for producing a high-loft, nonwoven fabric, which comprises:
   (a) forming an open pattern of adhesive;
   (b) depositing a first plurality of longitudinally alined elements on the open pattern of adhesive in an oscillatory pattern to form a web;
   (c) depositing a second plurality of longitudinally alined elements on the web in an oscillatory pattern out-of-phase with respect to the oscillatory pattern of the first plurality of longitudinally alined elements;
   (d) feeding the web onto a surface with the adhesive in contact with the surface;
   (e) softening the adhesive to a tacky state so that it adheres to the surface; and
   (f) impinging the elements and softened adhesive while adhered to the surface against the edge of a relatively moving gathering blade
      (i) to form a substantially continuous, consolidated, adhesive backing layer
      (ii) while looping the element portions located in the open spaces of the adhesive pattern outwardly from the backing layer.

2. A method for producing a high-loft, nonwoven fabric, which comprises:
   (a) feeding a plurality of slivers of fibers to a draw frame;
   (b) drawing the fibers in the draw frame to highly orient the fibers in the machine direction;
   (c) oscillating the fibers generally transversely with respect to the machine direction and depositing the thus oscillated, drawn and highly oriented fibers on an open adhesive pattern to form a web in which the fibers form generally sinusoidal wave patterns extending in the machine direction of the web;
   (d) feeding the web onto a surface with the adhesive in contact with the surface;
   (e) softening the adhesive to a tacky state so that it adheres to the surface; and
   (f) impinging the fibers and softened adhesive while adhered to the surface against the edge of a relatively moving gathering blade
      (i) to form a substantially continuous, consolidated, adhesive backing layer
      (ii) while looping the fiber portions located in the open spaces of the adhesive pattern outwardly from the backing layer.

3. A method for producing a high-loft, nonwoven fabric, which comprises:
   (a) feeding a first plurality of slivers of fibers to a first draw frame;
   (b) feeding a second plurality of slivers of fibers to a second draw frame;
   (c) drawing the fibers of the first and second pluralities of slivers through respective ones of the first and second draw frames to highly orient the fibers in the machine direction;
   (d) oscillating the fibers emanating from at least one of the first and second draw frames generally transversely with respect to the machine direction and depositing the drawn and highly oriented fibers, including the thus oscillated fibers, on an open adhesive pattern to form a web in which the oscillated fibers form generally sinusoidal wave patterns extending in the machine direction of the web;
   (e) feeding the web onto a surface with the adhesive in contact with the surface;
   (f) softening the adhesive to a tacky state so that it adheres to the surface; and
   (g) impinging the fibers and softened adhesive while adhered to the surface against the edge of a relatively moving gathering blade
      (i) to form a substantially continuous, consolidated, adhesive backing layer
      (ii) while looping the fiber portions located in the open spaces of the adhesive pattern outwardly from the backing layer.

4. A method for producing a fabric according to claim 3, in which the fibers emanating from only one of the first and second draw frames are oscillated.

5. A method for producing a fabric according to claim 4, in which only the fibers emanating from the first draw frame are oscillated.

6. A method for producing a fabric according to claim 4, in which only the fibers emanating from the second draw frame are oscillated.

7. A method for producing a fabric according to claim 3, in which the fibers emanating from both the first and second draw frames are oscillated and wherein the fibers from the second draw frame are deposited on the fibers from the first draw frame in out-of-phase relation.

8. A method for producing a fabric according to claim 3, in which at least certain of the slivers fed to at least one of the first and second draw frames differ from the remaining slivers in at least one of kind, size, color and quantity to produce a high-loft, nonwoven fabric having a patterned surface.

9. A method for producing a high-loft, nonwoven fabric from a web including flexible, longitudinally extending elements bonded in an open pattern of adhesive, which comprises:
   (a) reactivating the adhesive to a tacky state;
   (b) gathering the open pattern of tacky adhesive at a gathering station
      (i) to form a substantially continuous backing layer
      (ii) while looping the element portions located in the open spaces of the adhesive pattern outwardly from the backing layer; and
   (c) conveying the substantially continuous, gathered adhesive backing layer and outwardly looped elements away from the gathering station.

10. A method for producing a high-loft, nonwoven fabric which comprises:
    (a) preparing a web including flexible elements extending longitudinally of the web;

(b) bonding the elements in an open pattern of adhesive;
(c) reactivating the adhesive to a tacky state; and
(d) consolidating the open pattern of tacky adhesive
   (i) to form a substantially continuous backing layer
   (ii) while looping the element portions located in the open spaces of the adhesive pattern outwardly from the backing layer.

11. A method for producing a high-loft, nonwoven fabric which comprises:
(a) preparing a web including flexible elements extending longitudinally of the web;
(b) bonding the elements in an open pattern of adhesive;
(c) reactivating the adhesive to a tacky state;
(d) consolidating the open pattern of tacky adhesive at a consolidating station
   (i) to form a substantially continuous backing layer
   (ii) while looping the element portions located in the open spaces of the adhesive pattern outwardly from the backing layer; and
(e) conveying the substantially continuous, consolidated adhesive backing layer and outwardly looped elements away from the consolidating station.

12. A method for producing a high-loft, nonwoven fabric from a web including flexible, longitudinally extending elements bonded in an open pattern of adhesive, which comprises:
(a) feeding the web onto a surface with the adhesive in contact with the surface;
(b) softening the adhesive to a tacky state so that it adheres to the surface; and
(c) impinging the elements and softened adhesive while adhered to the surface against the edge of a relatively moving gathering blade
   (i) to loop the portions of the elements located in the open spaces of the adhesive pattern outwardly from the web and
   (ii) to consolidate the open adhesive pattern into a substantially continuous adhesive layer backing the outwardly looped elements.

13. A method for producing a high-loft, nonwoven fabric from a web including flexible, longitudinally extending elements bonded in an open pattern of adhesive, which comprises:
(a) feeding the web onto a surface with the adhesive in contact with the surface;
(b) softening the adhesive to a tacky state so that it adheres to the surface;
(c) impinging the elements and softened adhesive while adhered to the surface against the edge of a relatively moving gathering blade
   (i) to loop the portions of the elements located in the open spaces of the adhesive pattern outwardly from the web and
   (ii) to consolidate the open adhesive pattern into a substantially continuous adhesive layer backing the outwardly looped elements; and
(d) conveying the consolidated adhesive backing layer and outwardly looped elements away from the surface and the relatively moving blade.

14. A method for producing a high-loft, nonwoven fabric which comprises:
(a) preparing a web including fibrous elements extending longitudinally of the web;
(b) bonding the elements in an open pattern of longitudinally spaced, transversely extending bands of adhesive;
(c) feeding the web onto a movable surface with the adhesive in contact with the surface;
(d) reactivating the adhesive to a tacky state so that it adheres to the surface;
(e) carrying the web on the surface to the edge of a transverse gathering blade; and
(f) impinging the elements and the tacky adhesive against the edge of the blade
   (i) to consolidate the spaced bands of adhesive into a substantially continuous backing layer
   (ii) while looping the portions of the elements spanning the bands of adhesive outwardly from the backing layer and
   (iii) twisting the loops to lie substantially in transverse planes.

15. A method for producing a high-loft, nonwoven fabric, which comprises:
(a) preparing a web including flexible elements extending longitudinally of the web;
(b) bonding the elements in an open pattern of adhesive comprising spaced transverse bands of adhesive;
(c) feeding the web onto a movable surface with the adhesive in contact with the surface;
(d) softening the adhesive to a tacky state so that it adheres to the surface;
(e) carrying the web on the surface to the edge of a gathering blade;
(f) impinging the fibers and softened adhesive against the edge of the gathering blade
   (i) to loop the portion of the elements spanning the bands of adhesive outwardly from the web and
   (ii) to consolidate and bond the spaced bands of adhesive to each other to form a substantially continuous adhesive layer backing the outwardly looped elements; and
(g) conveying the consolidated adhesive backing layer and outwardly looped elements away from the surface and the blade.

16. A method for producing a high-loft, nonwoven fabric which comprises:
(a) preparing a web including flexible elements extending longitudinally of the web;
(b) embedding the elements in transversely extending bands of adhesive;
(c) carrying the web onto a surface with the adhesive in a tacky state and adhered to the surface; and
(d) impinging the elements and the tacky adhesive against the edge of a relatively moving gathering blade
   (i) to loop the portions of the elements located between the bands of adhesive outwardly from the surface and
   (ii) to consolidate the bands of adhesive into a substantially continuous adhesive layer backing the outwardly looped elements.

17. A method for producing a hight-loft, nonwoven fabric which comprises:
(a) preparing a web including flexible elements extending longitudinally of the web;
(b) embedding the elements in transversely extending bands of adhesive;
(c) carrying the web onto a surface with the adhesive in a tacky state and adhered to the surface;
(d) impinging the elements and the tacky adhesive against the edge of a relatively moving gathering blade
   (i) to loop the portions of the elements located between the bands of adhesive outwardly from the surface and
   (ii) to consolidate the bands of adhesive into a substantially continuous adhesive layer backing the outwardly looped elements; and
(e) conveying the consolidated adhesive backing layer and outwardly looped elements away from the blade.

18. A method according to claim 10 for producing a high-loft, nonwoven fabric, in which the loops formed by the outwardly looped element portions twist to lie substantially in transverse planes.

19. A method according to claim 10 for producing a high-loft, nonwoven fabric, in which the elements of the web are fibers of staple length.

20. A method according to claim 10 for producing a high-loft, nonwoven fabric, in which the elements of the web are monofilaments of synthetic plastic.

21. A method for producing a high-loft, nonwoven fabric according to claim 10, in which the adhesive for bonding the elements is applied to the web in a diamond pattern.

22. A method for producing a high-loft, nonwoven fabric according to claim 21, in which the diamond pattern is defined by criss-crossed, generally sinusoidal shaped lines of adhesive.

23. A method for producing a high-loft, nonwoven fabric according to claim 10, in which the adhesive for bonding the elements is applied to the web in parallel, generally transversely extending bands.

24. A method for producing a high-loft, nonwoven fabric according to claim 23, in which the bands of adhesive are substantially straight, continuous lines.

25. A method for producing a high-loft, nonwoven fabric according to claim 23, in which the bands of adhesive are substantially straight, discontinuous lines.

26. A method for producing a high-loft, nonwoven fabric according to claim 23, in which the bands of adhesive are sinusoidal lines.

27. A method for producing a high-loft, nonwoven fabric according to claim 10, in which the adhesive for bonding the elements is applied to the web in the form of a brick-like pattern.

28. A method for producing a high-loft, nonwoven fabric according to claim 10, in which the adhesive for bonding the elements is applied in bands extending diagonally across the web.

29. A method according to claim 17 for producing a high-loft, nonwoven fabric in which the transversely extending bands of adhesive form an open adhesive pattern and in which the height of the loops and the loft of the fabric is controlled by the distance across the open spaces of the adhesive pattern in the machine direction.

30. A method according to claim 17 for producing a high-loft, nonwoven fabric in which the bands of adhesive are evenly spaced in the machine direction a predetermined distance to provide loops of uniform height substantially one-half of the predetermined distance and a fabric with an even surface.

31. A method according to claim 18 for producing a high-loft, nonwoven fabric in which the transversely extending bands of adhesive form an open adhesive pattern in which each of the elements of the web are embedded at spaced points of attachment, the adhesive pattern being such that the distances between the points of attachment vary from element to element to produce loops of different height and a fabric of varying loft with a textured surface.

32. A method according to claim 13 for producing a high-loft, nonwoven fabric in which the backing layer while still tacky and the loops extending outwardly therefrom are conveyed from the blade edge at a level even with the edge and until the adhesive is set at a production rate determined by the relative speed of the movable surface and the gathering blade to produce a finished fabric having a flat back surface.

33. A method according to claim 13 for producing a high-loft, nonwoven fabric in which the backing layer while still tacky and the loops extending outwardly therefrom are conveyed from the blade edge at a level even with the edge and until the adhesive is set at a slower rate than the production rate determined by the relative speed of the movable surface and the gathering blade to form pleats of the fabric adjacent the blade edge with the inside facing tacky surfaces of the pleats bonded together to produce a ridged, high-bulk finished fabric.

34. A method according to claim 13 for producing a high-loft, nonwoven fabric in which the backing layer while still tacky and the loops extending outwardly therefrom are dropped from the blade edge to a level spaced below the blade edge and conveyed at that level until the adhesive is set at a production rate determined by the relative speed of the movable surface and the gathering blade, to form pleats of the fabric at that level with the inside facing tacky surfaces of the pleats bonded together to produce a ridged, high-bulk finished fabric.

35. A method according to claim 13 for producing a high-loft, nonwoven fabric, in which the edge of the gathering blade is at an angle $\alpha$ within the range of about 17 degrees to 34 degrees relative to a plane tangent to the surface at the line of contact with the blade edge.

36. A method according to claim 10 for producing a high-loft, nonwoven fabric from a web including flexible, longitudinally extending elements, in which the web elements are staple length fibers and the web is a highly drawn web of the fibers.

37. A method according to claim 10 for producing a high-loft, nonwoven fabric from a web including flexible, longitudinally extending elements, in which the web elements are staple length fibers and the web is a carded web of the fibers.

38. A method for producing a high-loft, nonwoven fabric according to claim 17 in which the surface is formed by a heated drum and in which the web is carried by rotation of the drum into impingement against the edge of a fixed gathering blade extending parallel with the axis of the drum and held against the surface thereof.

39. A method according to claim 38 for producing a high-loft, nonwoven fabric, in which the edge of the gathering blade is located at an angle $\alpha$ within the range of about 17° to about 34° relative to a plane tangent to the drum surface at the line of contact of the blade and the surface of the drum.

40. A method for producing a high-loft, nonwoven fabric according to claim 11, in which the web is prepared by drawing elements comprising slivers of fibers through a draw frame to orient a high percentage of the fibers in the machine direction, and depositing the drawn fibers on the open adhesive pattern.

41. A method for producing a high-loft, nonwoven fabric according to claim 11, in which the web is prepared:
(a) by drawing elements comprising a first set of slivers of fibers through a first draw frame to orient a high percentage of the fibers in the machine direction;
(b) depositing the first set of drawn fibers on the open adhesive pattern;
(c) by drawing elements comprising a second set of slivers of fibers through a second draw frame to orient a high percentage of the fibers in the machine direction; and
(d) depositing the second set of drawn fibers on the first set of drawn fibers.

42. A method for producing a high-loft, nonwoven fabric according to claim 40, in which at least certain of the slivers of fibers differ in at least one of kind, size, color and quantity from the remaining slivers of fibers so as to produce a patterned effect in the completed high-loft, nonwoven fabric.

43. A method for producing a high-loft, nonwoven fabric according to claim 41, in which at least certain of the slivers of fibers in the first and second sets of slivers differ in at least one of kind, size, color and quantity from the remaining slivers of fibers so as to produce a patterned effect in the completed high-loft, nonwoven fabric.

44. A method for producing a high-loft, nonwoven fabric according to claim 41, in which the second set of fibers drawn through the second draw frame is deposited on the first set of fibers drawn through the first draw frame in the form of longitudinally spaced sections of a web component.

45. A method for producing a high-loft, nonwoven fabric according to claim 40, in which the slivers of fibers as delivered to the drawn frame include a pattern and wherein the extent of draw in the draw frame is substantially equal to the ratio of the speed of the web through the consolidating station to the speed of the fabric as conveyed from the consolidating station, whereby the pattern presented to the draw frame is substantially reproduced in the finished fabric.

46. A method for producing a high-loft, nonwoven fabric according to claim 40, in which the slivers of fibers as delivered to the draw frame include a pattern and wherein the extent of draw in the draw frame is different than the ratio of the speed of the web through the consolidating station to the speed of the fabric as conveyed from the consolidating station, whereby the pattern presented to the draw frame differs from the pattern produced in the finished fabric in terms of dimensions in the machine direction.

47. A method for producing a high-loft, nonwoven fabric according to claim 46, in which the extent of draw in the draw frame exceeds the ratio of the speed of the web through the consolidating station to the speed of the fabric as conveyed from the consolidating station, whereby the pattern presented to the draw frame is reproduced in the finished fabric in a machine direction elongated form.

48. A method for producing a high-loft, nonwoven fabric according to claim 46, in which the extent of draw in the draw frame is less than the ratio of the speed of the web through the consolidating station to the speed of the fabric as conveyed from the consolidating station, whereby the pattern presented to the draw frame is reproduced in the finished fabric in a machine direction foreshortened form.

49. A method for producing a high-loft, nonwoven fabric which comprises:
(a) feeding a plurality of slivers of fibers to a draw frame wherein at least one of the slivers is composed of heat-shrinkable fibers;
(b) drawing the slivers of fibers through the draw frame to orient a high percentage of the fibers in the machine direction;
(c) depositing the drawn fibers on an open pattern of adhesive to form a web;
(d) bonding the fibers in the open pattern of adhesive;
(e) subjecting the web to heat for curing the web and shrinking the heat-shrinkable fibers;
(f) reactivating the adhesive to a tacky state; and
(g) consolidating the open pattern of tacky adhesive at a consolidating station
(i) to form a substantially continuous, consolidated, adhesive backing layer,
(ii) to consolidate the heat-shrinkable fibers into dense, thin, hard strips equal in number to the number of spaced slivers of heat-shrinkable fibers with each strip substantially devoid of fiber loops, while
(iii) looping the remaining fiber portions located in the open spaces of the adhesive pattern outwardly from the backing layer.

50. A method for producing a fabric according to claim 49, in which the slivers containing heat-shrinkable fibers contain a blend of rayon fibers and polypropylene fibers.

51. A method for producing a fabric according to claim 49, in which the slivers containing heat-shrinkable fibers are comprised solely of heat-shrinkable fibers selected from the group including:
(a) polypropylene fibers,
(b) polyethylene fibers.

52. A method for producing a laminated high-loft, nonwoven fabric from a web including flexible, longitudinally extending elements bonded in an open pattern of adhesive, which comprises:
(a) reactivating the adhesive to a tacky state;
(b) consolidating the open pattern of tacky adhesive at a consolidating station
(i) to form a substantially continuous backing layer
(ii) while looping the element portions located in the open spaces of the adhesive pattern outwardly from the backing layer;
(c) conveying the substantially continuous, consolidated, adhesive backing layer and outwardly looped elements away from the consolidating station to a laminating station; and
(d) adhesively bonding $n$ additional lamination(s) to the adhesive backing layer in the laminating station.

53. A method for producing a laminated high-loft, nonwoven fabric from a web including flexible, longitudinally extending elements bonded in an open pattern of adhesive, which comprises:
(a) reactivating the adhesive to a tacky state;
(b) consolidating the open pattern of tacky adhesive at a consolidating station
(i) to form a substantially continuous backing layer
(ii) while looping the element portions located in the open spaces of the adhesive pattern outwardly from the backing layer;
(c) conveying the substantially continuous, consolidated, adhesive backing layer and outwardly looped elements away from the consolidating station to a laminating station;
(d) feeding a lamination of sheet material into face-to-face contact with the substantially continuous, consolidated, adhesive backing layer;
(e) reactivating the substantially continuous, consolidated, adhesive backing layer to a softened state; and
(f) adhesively bonding the sheet material to the softened adhesive backing layer.

54. A method for producing a laminated high-loft, nonwoven fabric from a web including flexible, longitudinally extending elements bonded in an open pattern of adhesive, which comprises:
(a) reactivating the adhesive to a tacky state;
(b) consolidating the open pattern of tacky adhesive at a consolidating station.
(i) to form a substantially continuous backing layer
(ii) while looping the element portions located in the open spaces of the adhesive pattern outwardly from the backing layer;
(c) conveying the substantially continuous, consolidated, adhesive backing layer and outwardly looped elements away from the consolidating station to a laminating station;
(d) applying adhesive to the substantially continuous, consolidated, adhesive backing layer;
(e) feeding a lamination of sheet material into face-to-face contact with the adhesively coated, substantially continuous, consolidated, adhesive backing layer; and
(f) bonding the sheet material to the adhesively coated, substantially continuous, consolidated, adhesive backing layer.

55. A method for producing a laminated high-loft, nonwoven fabric from a web including flexible, longitudinally extending elements bonded in an open pattern of adhesive, which comprises:
(a) reactivating the adhesive to a tacky state;
(b) consolidating the open pattern of tacky adhesive at a consolidating station
(i) to form a substantially continuous backing layer
(ii) while looping the element portions located in the open spaces of the adhesive pattern outwardly from the backing layer;

(c) conveying the substantially continuous, consolidated, adhesive backing layer and outwardly looped elements away from the consolidating station to a laminating station;

(d) feeding a first lamination of sheet material into face-to-face contact with the adhesively coated, substantially continuous, consolidated adhesive backing layer;

(e) feeding a second lamination of sheet material into face-to-face contact with the first lamination of sheet material;

(f) applying adhesive to at least one of the substantially continuous, consolidated, adhesive backing layer, the first lamination and the second lamination; and (g) bonding the first lamination to the substantially continuous, consolidated adhesive backing layer, and the second lamination to the first lamination to form a three-ply laminated high-loft, nonwoven fabric.

56. A method for producing a laminated, high-loft, nonwoven fabric according to claim 52 in which at least one of the $n$ additional lamination(s) is a reinforcing material.

57. A method for producing a laminated, high-loft, nonwoven fabric according to claim 52 in which at least one of the $n$ additional lamination(s) is scrim.

58. A method for producing a laminated, high-loft nonwoven fabric according to claim 52 in which at least one of the $n$ additional lamination(s) is foam rubber.

59. A method for producing a laminated, high-loft, nonwoven fabric according to claim 52 in which at least one of the $n$ additional lamination(s) is a second high-loft, nonwoven fabric having a substantially continuous, consolidated, adhesive backing layer and outwardly looped elements with the looped elements in the two high-loft, nonwoven fabric laminations projecting in opposite directions.

60. A method for producing a laminated, high-loft, nonwoven fabric according to claim 52 in which a first one of the $n$ additional lamination(s) is an adhesively porous reinforcing material, and a second one of the $n$ additional lamination(s) is foam rubber.

61. A method for producing a laminated, high-loft, nonwoven fabric according to claim 52 in which a first one of the $n$ additional lamination(s) is an adhesively porous reinforcing material, and a second one of the $n$ additional lamination(s) is a high-loft, nonwoven fabric having a substantially continuous, consolidated, adhesive backing layer in face-to-face contact with the adhesively porous reinforcing material and outwardly looped elements projecting therefrom.

62. A method for producing a high-loft, nonwoven fabric with an even depth from a web including flexible, longitudinally extending elements bonded in an open pattern of adhesive, which comprises:

(a) reactivating the adhesive to a tacky state;
(b) consolidating the open pattern of tacky adhesive
  (i) to form a substantially continuous, consolidated adhesive backing layer (ii) while looping the element portions located in the open spaces of the adhesive pattern outwardly from the backing layer; and (c) shearing at least certain of the outwardly looped element portions at an intermediate loop height to provide a cut-pile fabric surface.

63. A method for producing a fabric according to claim 62, in which the open pattern of adhesive comprises parallel bands of adhesive spaced equally apart in the machine direction so as to form a gathered, high-loft, nonwoven fabric in which the looped element portions are substantially uniform in height, whereby during the shearing operation substantially all of the looped element portions are shorn.

64. A method for producing a fabric according to claim 62, in which the open pattern of adhesive comprises transversely extending bands of adhesive in which each of the elements of the web are embedded at spaced points of attachment, the adhesive pattern being such that the distances between the points of attachment vary from element to element to produce loops of different height, whereby during the shearing operation only those loops extending above the intermediate loop height are shorn.

65. A method for producing a high-loft, nonwoven fabric, which comprises:

(a) forming an open pattern of adhesive;
(b) depositing a plurality of longitudinally alined elements on the open pattern of adhesive in an oscillatory pattern to form a web;
(c) feeding the web onto a surface with the adhesive in contact with the surface;
(d) softening the adhesive to a tacky state so that it adheres to the surface; and
(e) impinging the elements and softened adhesive while adhered to the surface against the edge of a relatively moving gathering blade
  (i) to form a substantially continuous, consolidated, adhesive backing layer
  (ii) while looping the element portions located in the open spaces of the adhesive pattern outwardly from the backing layer.

References Cited

UNITED STATES PATENTS

| | | | |
|---|---|---|---|
| 3,720,554 | 3/1973 | Stumpf | 156—62.6 |
| 3,327,708 | 6/1967 | Sokolowski | 156—290 |
| 2,639,250 | 5/1953 | Reinhardt | 161—65 |
| 3,047,444 | 7/1962 | Harwood | 156—291 |
| 2,550,686 | 5/1951 | Goldman | 161—66 |
| 3,266,969 | 8/1966 | Makansi | 161—63 |

DOUGLAS J. DRUMMOND, Primary Examiner

F. FRISENDA, Jr., Assistant Examiner

U.S. Cl. X.R.

156—291, 298, 320; 161—67, 84, 146